(12) United States Patent
Rajchel et al.

(10) Patent No.: US 11,254,570 B2
(45) Date of Patent: Feb. 22, 2022

(54) PROCESS FOR TREATING A MIXED FEED OF HYDROGEN SULFIDE GAS AND AMMONIA GAS TO PRODUCE AMMONIUM THIOSULFATE AND INCLUDING METHODOLOGY FOR EMISSIONS CONTROL

(71) Applicant: Clarke Rajchel Engineering, LLC, Laramie, WY (US)

(72) Inventors: Marcus Rajchel, Laramie, WY (US); Olivia Rajchel, Arvada, CO (US); Sydney Rajchel, Boston, MA (US)

(73) Assignee: CLARKE RAJCHEL ENGINEERING, LLC, Laramie, WY (US)

( * ) Notice: Subject to any disclaimer, the term of this patent is extended or adjusted under 35 U.S.C. 154(b) by 0 days.

(21) Appl. No.: 17/235,735

(22) Filed: Apr. 20, 2021

(65) Prior Publication Data

US 2021/0331923 A1   Oct. 28, 2021

Related U.S. Application Data

(60) Provisional application No. 63/017,848, filed on Apr. 30, 2020, provisional application No. 63/015,332, filed on Apr. 24, 2020.

(51) Int. Cl.
*C01B 17/64* (2006.01)

(52) U.S. Cl.
CPC .................... *C01B 17/64* (2013.01)

(58) Field of Classification Search
CPC ........... C01B 17/64; C01C 1/245; C01C 1/28; C05C 3/00; C05C 11/00
See application file for complete search history.

(56) References Cited

U.S. PATENT DOCUMENTS

| | | | | |
|---|---|---|---|---|
| 3,473,891 A | * | 10/1969 | Mack | ...................... C01B 17/64 423/514 |
| 6,159,440 A | | 12/2000 | Schoubye | |
| 2002/0131927 A1 | * | 9/2002 | Anderson | .......... B01D 53/1493 423/514 |
| 2003/0039606 A1 | | 2/2003 | Schoubye | |
| 2003/0223930 A1 | * | 12/2003 | Schoubye | ............... C01B 17/64 423/514 |

FOREIGN PATENT DOCUMENTS

| | | | | | |
|---|---|---|---|---|---|
| CA | 2 659 286 C | * | 8/2014 | ............. | C01B 17/04 |
| EP | 1375422 A1 | | 1/2004 | | |
| EP | 3 838 381 A1 | * | 6/2021 | ............. | B01D 53/52 |

* cited by examiner

*Primary Examiner* — Timothy C Vanoy
(74) *Attorney, Agent, or Firm* — Kirton McConkie; Evan R. Witt

(57) ABSTRACT

This invention relates to production of an aqueous solution containing ammonium thiosulfate from a feed gas containing hydrogen sulfide ($H_2S$) and ammonia ($NH_3$). Sufficient separation of feed gas $H_2S$ from $NH_3$ is achieved by controlling individual $NH_3$ and $H_2S$ absorption mass-transfer rates in a single co-current stage, whereby a first gas contacts a first liquid containing ammonium bisulfite (ABS). Substantially more $NH_3$ is absorbed than $H_2S$, converting ABS to diammonium sulfite (DAS). A portion of DAS reacts with a sufficiently small portion of $H_2S$ to produce ATS and leaves as a second liquid stream. A larger portion of $H_2S$ leaves as a second gas stream. The second gas stream is oxidized to sulfur dioxide ($SO_2$) comprising a third gas stream. The third gas stream contacts the second aqueous stream in a second contact stage whereby DAS in the second liquid stream is converted to ABS and returned to the first contacting zone.

19 Claims, 9 Drawing Sheets

PROCESS FOR TREATING A MIXED FEED OF HYDROGEN SULFIDE GAS AND AMMONIA GAS TO PRODUCE AMMONIUM THIOSULFATE AND INCLUDING METHODOLOGY FOR EMISSIONS CONTROL

CROSS-REFERENCE TO RELATED APPLICATIONS

This application claims the benefit of U.S. Provisional Application No. 63/015,332, filed Apr. 24, 2020 and the benefit of U.S. Provisional Application No. 63/017,848, filed Apr. 30, 2020, which applications are incorporated herein by reference.

TECHNICAL FIELD

This process is in the field of ammonium thiosulfate (ATS) production from a gaseous process feed stream containing an arbitrary mixture of hydrogen sulfide gas ($H_2S$) and ammonia gas ($NH_3$) and water vapor arising from, for example, a typical refinery sour water stripper (also known as "Sour Water Stripper Gas" or SWSG).

BACKGROUND

Certain byproduct/waste gas streams produced by, for example, oil and gas refining processes contain mixtures of hydrogen sulfide gas ($H_2S$), ammonia gas ($NH_3$), water vapor and small quantities of other non-reactive gasses such as carbon dioxide gas ($CO_2$). Hydrogen sulfide and ammonia, being poisonous and/or greenhouse gases, cannot be vented to atmosphere and therefore must normally be removed and treated before being discharged as refinery effluents. Common methods of removing hydrogen sulfide include: (1) Chemical solvent processes that react with acid gasses in a reversable acid-base neutralization using regenerable reagents such as di-ethanolamine (DEA) or methyl-di-ethanolamine (MDEA), (2) Physical Solvent Processes that do not react with the gasses, and that are generally less energy intensive than chemical solvent processes. These include those such as Universal Oil Products' (UOP) Selexol Process, Fluor's Fluor Solvent (Propylene carbonate) process, hot potassium carbonate pressure-swing processes such as CATACARB. These $H_2S$ recovery processes are normally combined with a sulfur conversion unit such as a Claus or Modified Claus process that converts the recovered hydrogen sulfide to elemental sulfur. While it is feasible for ammonia gas burned in the reaction furnace of a Claus unit, there are well-known operating problems associated with processing ammonia containing streams in conventional Claus units.

Other treatment methods produce sulfur directly through (3) wet-oxidation processes that oxidize $H_2S$ to elemental sulfur by passing the gas through a solution containing a regenerable reagent such as the iron-based "catalyst" in Merichem's Lo-Cat process and Shell's Sulferox process, or vanadium-oxide Stretford processes where pentavalent vanadium ($V^{(V)}$) is used to oxidize $H_2S$ to $S^0$ and the resulting tetravalent vanadium ($V^{(IV)}$) is regenerated by aerating the solution.

In all the above cases, the presence of ammonia is not addressed. These processes do not capture $NH_3$. Ammonia cannot be released to the environment; it is a strong greenhouse gas.

A class of treatment processes, including the method of the present invention, rely on the well-known chemistry involving ammonia, reduced sulfur, usually $S^0$ or $H_2S$, and sulfur dioxide (U.S. Pat. No. 3,431,070, et al.) for producing ATS.

The challenge in treating a mixed feed gas stream to produce ammonium thiosulfate lies in the requirement to separate (or reject) sufficient $H_2S$ from the feed stream in the ATS-producing step while absorbing substantially all of the feed $NH_3$ so that the rejected $H_2S$ can be used to produce the aqueous ammonium bisulfite and diammonium sulfite (ABS/DAS) containing reagent required for the ATS production reaction.

Some of the mixed feed-to-ATS processes rely on first separating $NH_3$ from $H_2S$ using tall, multi-stage sour water stripping towers that are quite capital intensive. After the separation of the feed components, the feeds are further processed and re-combining in a separate ATS producing process.

Other proposed processes have attempted, but have failed, to eliminate the above $NH_3$-$H_2S$ separation process and its associated equipment. These other processes instead attempt to treat the mixed feed by effecting a preferential absorption of $NH_3$ over $H_2S$ in an ATS-producing step. Previous technological approaches for treating the mixed feed have all generally failed in this critical step owing to their use of some form of counter-current packed/trayed tower for gas-liquid contacting.

To clarify, the challenge in achieving preferential absorption in this first contacting step is the requirement that substantially all ammonia must be recovered through reactive absorption with ABS contained in the absorbing solution, creating diammonium sulfite (DAS). At the same time in this first contacting step, no more than 26% and 32% of the feed $H_2S$ can be absorbed into the solution where its reaction with ABS and DAS converts it to ATS. The balance of non-absorbed $H_2S$ would then be burned to make sulfur dioxide ($SO_2$), then the $SO_2$ would be used to create "new" ABS, and this new ABS would replace the ABS consumed by $H_2S$ absorbed in the first contacting step. However, typical, industry standard counter-current packed or trayed column operation does not lend itself to such objectives since the counter-current effect uses multiple "equilibrium" stages. Each of the stages operate at some reduced fraction of equilibrium (or tray efficiency) and thus require the column to be designed using multiple stages to affect the desired degree of $NH_3$ absorption. The problem with using towers lies with the objective of their operation: in combination with stage inefficiencies, counter-current contact in reactive absorption processes favors chemical equilibrium. Column operation where reactive absorption of both $NH_3$ and $H_2S$ can occur therefore tends to be indiscriminate and leads to excessive absorption of $H_2S$ and over-consumption of ABS and DAS. Moreover, because of the over-consumption of ABS and DAS, the feed gasses stop being absorbed within the process equipment and the ATS Unit stops producing ATS and the process fails.

In prior art (e.g., as described in U.S. Pat. No. 6,159,440), ATS production from refinery sour-gas streams (i.e., $H_2S$-only and mixed $H_2S/NH_3$ SWSG) has only been feasible by assuring that no more than about ⅓ of the feed gas to the production unit consist of SWSG and no less than ⅔ of the feed sulfur comes from a substantially $NH_3$-free (clean) supply of $H_2S$. The consequence to the process is that ⅔ or more of the stoichiometric ammonia requirement must be fed from an external purchased supply. The impact on both the technical and commercial efficacy to large-scale operations using previous approaches are broad ranging. It is far better, practically and commercially, to apply technology that treats the mixed feed (e.g., SWSG) alone, without any significant requirement for outside reagents.

It will be appreciated that there is a need in the art for systems and processes for treating a gaseous process feed stream containing an arbitrary mixture of hydrogen sulfide gas and ammonia gas to produce ammonium thiosulfate with no or minimal requirement for outside $H_2S$ and/or $NH_3$ reagents.

It would be a further advancement in the art to contact the gaseous process feed stream with a first liquid containing ammonium bisulfite (ABS) under conditions where substantially more $NH_3$ is absorbed than $H_2S$.

The disclosed invention addresses the shortcomings of prior art ATS production by eliminating or substantially reducing the requirements for outside clean $H_2S$ and/or $NH_3$ reagents. The disclosed methods of the current invention significantly limit absorption of $H_2S$ fed to the first gas-liquid contact stage where ATS is produced while absorbing substantially all of the $NH_3$ carried with the gaseous process feed stream.

SUMMARY OF THE INVENTION

The disclosed invention relates to a process for producing ammonium thiosulfate-containing solutions from a feed gas containing a mixture of hydrogen sulfide ($H_2S$) and ammonia ($NH_3$). More specifically the disclosed invention produces highly concentrated ammonium thiosulfate (ATS) solutions from an arbitrary feed mixture of $H_2S$ and $NH_3$ in a gas-liquid absorption process that includes liquid phase chemical reactions. The produced ATS solutions may be used as a liquid-applied agricultural fertilizer.

Various embodiments are listed below. It will be understood that the embodiments listed below may be combined not only as listed below, but in other suitable combinations in accordance with the scope of the invention.

One disclosed aspect of the invention includes a method for making an aqueous solution of ammonium thiosulfate (ATS). The method includes a step of co-currently contacting a first gas feed stream containing hydrogen sulfide ($H_2S$) and ammonia ($NH_3$) with a first liquid stream containing an aqueous solution of ammonium bisulfite (ABS) and di-ammonium sulfite (DAS) within a first gas-liquid contact stage. The first gas feed stream and the first liquid stream are contacted under controlled physical conditions to cause the following liquid chemical reactions to occur and to produce a second gas stream and a second liquid stream:

$$NH_3 + ABS \leftrightarrows DAS \quad (1)$$

$$H_2S + DAS \rightarrow AHS + ABS \quad (2)$$

$$2 \, AHS + 4 \, ABS \rightarrow 3 \, ATS + 3 \, H_2O \quad (3)$$

The physical conditions are controlled within the first gas-liquid contact stage to control relative absorption mass-transfer rates for $NH_3$ and $H_2S$ to favor absorption of $NH_3$ into the liquid phase and cause reaction (1) and to limit absorption of $H_2S$ into the liquid phase and thereby limit the formation of ammonium hydrosulfide (AHS) in reaction (2) and limit the formation of ATS in reaction (3).

The physical conditions which may be controlled are selected from a temperature of the first gas stream, a temperature of the first liquid stream, a ratio of feed rates of the first gas feed stream and first liquid feed stream, a concentration of dissolved ABS and DAS in the first liquid stream, pH of the first liquid stream, a first liquid stream buffer capacity, and combinations thereof.

The second gas stream contains unreacted $H_2S$ and the second liquid stream contains a mixture of DAS, ATS, and ABS.

A first fraction of the second liquid stream is removed to recover the aqueous solution of ATS.

The disclosed method may also include the step of oxidizing $H_2S$ in the second gas stream to form $SO_2$ and produce a third gas stream. The third gas stream containing $SO_2$ may be contacted with a second fraction of the second liquid stream within a second gas-liquid contact stage to cause the following chemical reaction to occur:

$$SO_2 + DAS \rightarrow 2 \, ABS \quad (4)$$

A fourth gas stream and a third liquid stream containing ABS and DAS are produced.

A portion of the third liquid stream may be recycled to the first gas-liquid contact stage as the first liquid stream.

In an aspect of the disclosed method, the quantity of hydrogen sulfide absorbed in the $1^{st}$ gas-liquid contact stage may be sufficiently limited so that no more $H_2S$ is hydrolyzed to AHS and then converted to ATS than the maximum amount allowed by the ATS reaction stoichiometry in the $1^{st}$ gas-liquid contacting stage as defined by the $1^{st}$ Gas $H_2S$ Absorption/Rejection Ratio, according to:

$$\frac{\text{mols } H_2S \text{ into } 2^{nd} \text{ Gas}}{\text{mols } H_2S \text{ absorbed into } 1^{st} \text{ Liquid}} = 1^{st} \text{ Gas } H_2S \frac{\text{Rejection}}{\text{Absorption}} \text{Ratio}$$

where, the $1^{st}$ Gas $H_2S$ Rejection/Absorption Ratio is calculated as:

$$1^{st} \text{ Gas } H_2S \frac{\text{Rejection}}{\text{Absorption}} \text{Ratio} = \left[ \frac{4/3\left(\frac{C_{ATS,mass}}{MW_{ATS}}\right) + \left(\frac{C_{B,mass}}{MW_{ABS}}\right) + \left(\frac{C_{AS,mass}}{MW_{AS}}\right)}{2/3\left(\frac{C_{ATS,mass}}{MW_{ATS}}\right)} \right]$$

where in the $1^{st}$ Gas $H_2S$ Rejection/Absorption Ratio equation: $C_{ATS,mass}$, $C_{B,mass}$, and $C_{AS,mass}$ is in units of mass of solute-per-mass of aqueous solution, MW is molecular weight of each in consistent units, such that the quantity of hydrogen sulfide present in the $2^{nd}$ gas stream, when oxidized to sulfur dioxide, can be converted to aqueous ammonium bisulfite and returned to the $1^{st}$ gas-liquid contact stage.

In an aspect of the disclosed method, the $H_2S$-rich $2^{nd}$ gas stream is oxidized to provide a $3^{rd}$ gaseous stream that is rich in $SO_2$, that is fed together with the DAS-rich $2^{nd}$ liquid to a $2^{nd}$ gas-liquid contacting zone where the molar quantity of $SO_2$ is hydrolyzed with an equal-molar portion of DAS, and converting each species to aqueous ABS, and the effluent liquid of from the $2^{nd}$ gas-liquid contact stage comprises the $1^{st}$ liquid feed for recycle back to the $1^{st}$ gas-liquid contact stage, and the vapor effluent comprises a $4^{th}$ gas stream.

In an aspect of the disclosed method, a separate source of hydrogen sulfide is added to the $2^{nd}$ gas stream to satisfy the ABS production requirement for the ATS reaction in the $1^{st}$ gas-liquid contacting stage in the case where the $H_2S$ rejection requirement, as defined by the $1^{st}$ Gas $H_2S$ Rejection/Absorption Ratio equation, has not been met. Alternatively, a separate source of aqueous ABS may be added to the $1^{st}$ or $2^{nd}$ liquid stream, as a substitute for the addition hydrogen sulfide gas.

In an aspect of the disclosed method, in the case that the $1^{st}$ feed gas contains a molar excess of $H_2S$ relative to its molar rate of $NH_3$, whereby the quantity of DAS produced in the $2^{nd}$ liquid is insufficient for conversion of all $SO_2$ in the $3^{rd}$ gas stream to ABS, a separate source of $NH_3$ may be added to either the $1^{st}$ or $2^{nd}$ liquid stream, converting a portion of the stream's ABS to DAS. In an embodiment, the excess $H_2S$ may be split as a purge stream from the $2^{nd}$ gas prior to oxidation and removed from the process and no separate source of $NH_3$ is added.

In the disclosed method, the type of gas-liquid contact stage may be a Venturi-type fume scrubber. In the disclosed method, the type of gas-liquid contact stage may be a co-current contact stage, such as a static mixer.

In the disclosed method, two or more single stage co-current contactors may be operated sequentially as the $1^{st}$ gas-liquid contact stage.

In the disclosed method, the $4^{th}$ gas stream, containing $SO_2$ and some $NH_3$, may be recovered and returned to the $1^{st}$ or $2^{nd}$ liquid streams, in a chemically reactive absorption stage using a separate source of ammonia and water as a scrubbing agent, returning an ABS/DAS buffer solution to the process and to prevent $SO_2$ and $NH_3$ release in the $5^{th}$ gas stream to the environment.

In the disclosed method, the absorption stage may comprise four counter currently organized sequential gas-liquid stages comprising:
  a. Zone 1 (bottom) where a portion of $2^{nd}$ liquid stream is directed to the contact zone and the $4^{th}$ gas stream flows counter currently through and exits toward Zone 2;
  b. Zone 2 (lower-mid) where a packed or trayed and including a trap-tray and circulation pump, anhydrous or aqua ammonia, is added to the circulating solution on pH feedback control, a dilute ABS-DAS solution, overflows the trap tray with the liquor supplementing the liquid feed to Zone 1, and the $4^{th}$ gas stream leaves the stage toward Zone 3 and has, comparatively more $NH_3$ than $SO_2$, and this section captures most of the $SO_2$ in the $4^{th}$ gas stream;
  c. Zone 3 (upper-mid) whereby utilizing a packed or trayed section and including a trap-tray and circulation pump, a dilute solution captures $NH_3$ and very small quantities of $SO_2$ in the vapor leaving Zone 2, whereby this section removes most $NH_3$ and $SO_2$ that would be considered important before environmental release, and the further scrubbed $4^{th}$ gas stream then flows into Zone 4 and the very dilute liquor becomes the liquid feed to Zone 2; and
  d. Zone 4 (upper) where process make-up water is added to a top tray and whereby small, ppm-level quantities of $NH_3$ and $SO_2$ are absorbed as the $4^{th}$ gas stream flows counter currently to the liquid, and the $NH_3$ and $SO_2$ are removed to very low concentrations since each are completely hydrolyzed into the make-up water.

In the disclosed method, the $1^{st}$ feed liquid buffer concentration may be controlled to between 3 wt. % and 25 wt. % to provide the degree of $H_2S$ rejection dictated by the requirement defined in the $1^{st}$ Gas $H_2S$ Rejection/Absorption Ratio equation.

In the disclosed method, the ratio of $1^{st}$ feed liquid rate to the $1^{st}$ feed gas rate may be between 15:1 and 75:1 on a weight-to-weight basis in order to provide the degree of $H_2S$ rejection dictated by the requirement defined in the $1^{st}$ Gas $H_2S$ Rejection/Absorption Ratio equation while simultaneously achieving substantially complete absorption of the $1^{st}$ feed gas ammonia.

In the disclosed method, the temperature may be increased to increase the fraction of feed gas $H_2S$ to the $1^{st}$ gas-liquid contact stage rejected to the $2^{nd}$ gas stream or decreased to decrease the fraction rejected to provide the degree of $H_2S$ rejection dictated by the requirement defined in the $1^{st}$ Gas $H_2S$ Rejection/Absorption Ratio equation.

In the disclosed method, the measured pH of the concentrated aqueous $1^{st}$ liquid feed may be controlled to be in the range between 5.3 and 5.8, or when measured in a 5,000:1 or greater dilution, a pH between 6.3 and 6.9, such that substantially all of the $1^{st}$ feed gas ammonia is absorbed in the $1^{st}$ gas-liquid contact stage and is recovered into the $2^{nd}$ liquid stream effluent from the stage.

In the disclosed method, the value of the $1^{st}$ feed gas ratio of ammonia-to-hydrogen sulfide may be used to modify other process independent parameters of feed flow, temperature, pH, and buffer concentration, to optimize ammonia absorption in the $1^{st}$ gas-liquid contact stage.

In the disclosed method, the temperature of the reaction zone may be sufficiently high (i.e. temperatures around 90° C.) to increase the velocity of gas traffic through the contact stage, such that the residence time of the feed streams in the reaction zone is decreased.

In the disclosed method, during a time interval where the first feed gas flow rate and composition to the first gas-liquid stage are constant and the first liquid feed to the first gas-liquid contactor is also constant, changes in the measured difference between the pH of the liquid feed to the first gas-liquid contactor and the pH of the liquid feed to the second gas-liquid contactor may be interpreted as a change in the buffer concentration, of either liquid stream, in the interval between measurements of the pH difference between the two streams.

It is to be understood that both the foregoing brief description and the following detailed description are examples and explanatory and are not restrictive of the invention, as claimed. It should also be understood that the embodiments may be combined, or that other embodiments may be utilized and that structural changes, unless so claimed, may be made without departing from the scope of the various embodiments of the present invention. The following detailed description is, therefore, not to be taken in a limiting sense.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
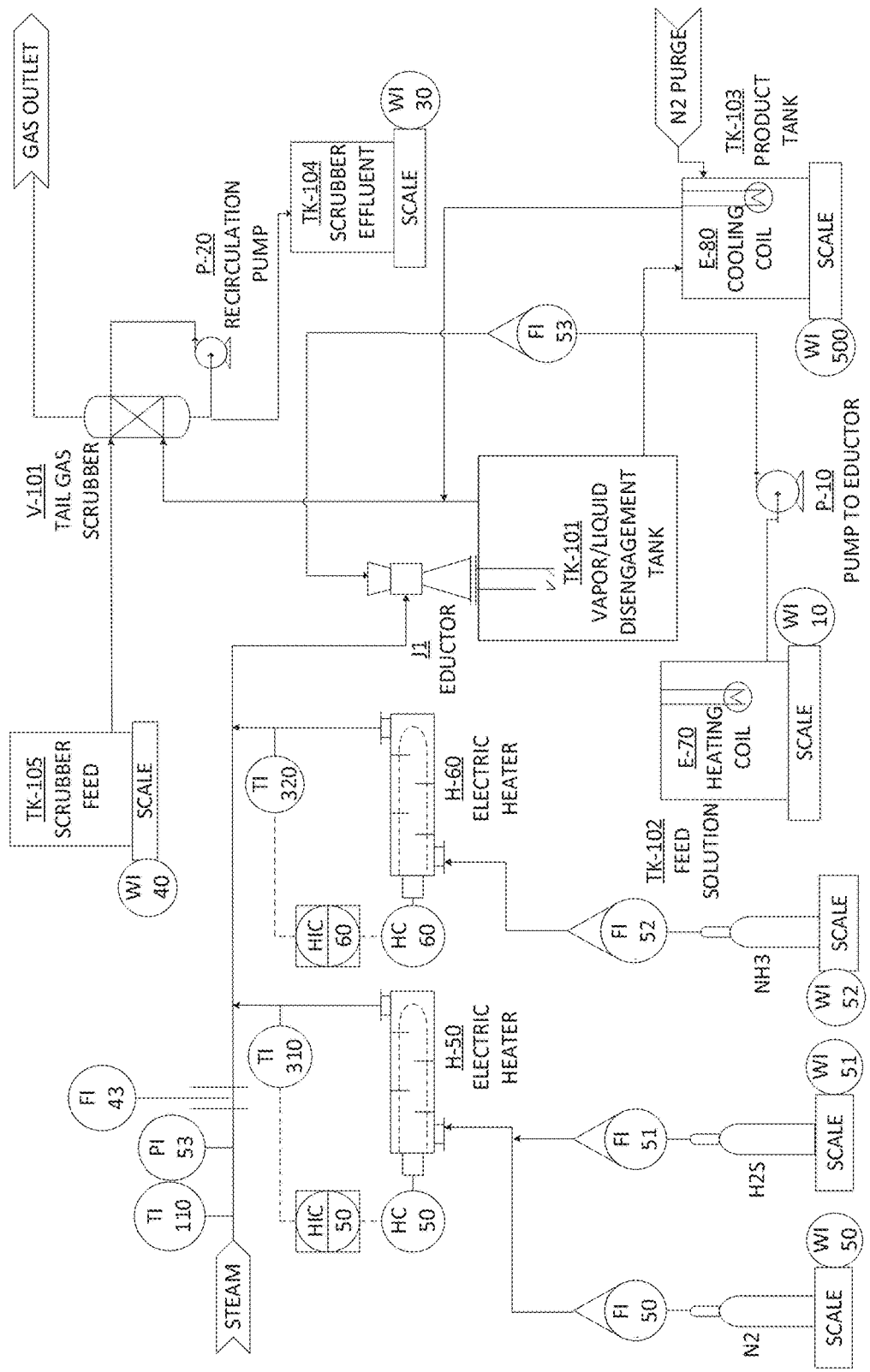
FIG. 1 is a schematic representation of a pilot-scale apparatus used to test the disclosed process for treating a mixed feed of $H_2S$ and $NH_3$ to produce ammonium thiosulfate.

The disclosed invention relates to production of ammonium thiosulfate solutions from a feed gas containing hydrogen sulfide ($H_2S$) and ammonia ($NH_3$). Sufficient separation of feed gas $H_2S$ from feed gas $NH_3$ is achieved by controlling individual $NH_3$ and $H_2S$ absorption mass-transfer rates in a single co-current stage, whereby the feed gas contacts a first liquid containing ammonium bisulfite (ABS). Substantially more $NH_3$ is absorbed than $H_2S$, converting ABS to diammonium sulfite (DAS). A portion of DAS reacts with a sufficiently small portion of $H_2S$ to produce ATS and leaves as a second liquid stream. A larger portion of $H_2S$ leaves as a second gas stream. The second gas stream is oxidized to sulfur dioxide ($SO_2$) comprising a third gas stream. The third gas stream contacts the second aqueous stream in a second contact stage whereby DAS in the second liquid stream is converted to ABS and returned to the first contacting zone.

Terminology Definitions:

Ammonium Bisulfite: ABS=$(NH_4)HSO_3$ $MW_{(ABS)}$=99.11 kg/kg-mol

Diammonium Sulfite: DAS=$(NH_4)_2SO_3$ $MW_{(DAS)}$=116.14 kg/kg-mol

Ammonium Bisulfide: AHS=$(NH_4)HS$ $MW_{(AHS)}$=51.11 kg/kg-mol

Ammonium Thiosulfate: ATS=$(NH_4)_2S_2O_3$ $MW_{(ATS)}$=148.20 kg/kg-mol

Ammonium Sulfate: AS=$(NH_4)SO_4$ $MW_{(AS)}$=132.14 kg/kg-mol

Buffer Conc., $C_B$: Total sulfite buffer concentration, the sum of concentration of both ABS+DAS, expressed as ABS in solution, in units of mass of solute per mass of solution:

$$c_{B,mass} = \frac{kg(ATS) + kg(DAS) \times MW_{(ABS)}/MW_{(DAS)}}{kg(Solution)}$$

or in moles of solute per mass of solution:

$$c_{B,mol} = \frac{kmol(ATS) + kmol(DAS)}{kg(Solution)}$$

Some practitioners or ATS customers refer to the mass concentration, $C_{B,mass}$, in weight percent by multiplying by 100.

Buffer Capacity, $mC_B$: Buffer Concentration multiplied by mass rate of solution, m, in kg/hr of ABS-containing aqueous solution.

"Neat" pH: The pH that would be measured using as standard laboratory pH for concentrated ABS/DAS/ATS-containing process solutions.

Dilute pH: pH of an "infinite dilution" of a concentrated ABS/DAS/ATS-containing process solution.

Essential Aqueous-Phase Chemical Reactions:

ABS: $SO_2$+DAS→2 ABS

DAS: $NH_3$+ABS⇌DAS

AHS: $H_2S$+DAS→AHS+ABS

ATS: 2 AHS+4 ABS→3 ATS+3 $H_2O$

Relationship Between Buffer Capacity and pH:

The buffer capacity for absorbing $NH_3$ is directly proportional to the concentration of ABS in solution and its pH. The solution pH is used as an indicator of the distribution of ABS and DAS in solution. For dilute solutions, using the literature value for pKa=6.91, the acid-base equilibrium expression can be re-written in terms of the molar ratio of ABS and DAS concentrations as a function of pH:

$$\text{Ratio of } ABS:DAS(\text{dilute solutions}) = R_{dilute} = \left(\frac{ABS}{DAS}\right) = 10^{(6.91-pH)}$$

and as mole-fractions, $$x_{ABS} = \frac{R}{(1+R)}$$

and $$x_{DAS} = 1 - x_{ABS}$$

This ABS:DAS ratio/pH relationship set forth above is not accurate for the highly concentrated solutions typically found in the process that normally have total dissolved salt concentrations of between 60 to 70 wt. % and are highly non-ideal. Empirically, it has been found for highly concentrated solutions, modifying the value for pKa by (−1.1+/−0.1) gives acceptable estimates of the ratio of ABS:DAS.

$$\text{Ratio of } ABS:DAS(\text{conc. soln.}) = R_{conc.} = \left(\frac{ABS}{DAS}\right) = 10^{(5.81-pH)}$$

For example, for a typical process solution that measured "neat" at 5.8, the "dilute" expression estimates the ratio of ABS:DAS ≅13, but it is not accurate. The above "conc. soln." expression delivers a value of ABS:DAS=1.0:1, which is very close to the correct value. Laboratory testing confirms, by performing a 5,000:1 dilution with water on a sample of "neat" solution, the diluted sample will measure close to pH ≅6.9, indicating ABS:DAS ≅1.0:1, as expected the total normality of dissolved sulfite salts in the diluted sample will fall into the valid range for ideal solution behavior.

To maximize absorption of $NH_3$ from the process feed gas according to the disclosed invention, a sufficient excess ABS must be present as buffer capacity in order to accept all feed $NH_3$ for conversion to DAS and preferably at least 1.5-times the molar feed rate of $NH_3$.

Buffer Capacity for $NH_3 = m_{soln} \times C_B \times x_{ABS}$ where buffer capacity is expressed in appropriate units of moles-per-unit time. ABS can react to absorb ammonia whereas DAS is not useful for ammonia absorption.

Similarly, for absorption of $SO_2$, a sufficient excess buffer capacity with regard to DAS for conversion of $SO_2$ to ABS. Again, the pH of the absorbing solution gives a leading indicator of the ratio of ABS:DAS and the value of $R_{conc.}$ is useful for computing the buffer concentration of DAS, and the buffer capacity for $SO_2$ absorption can be calculated as follows:

$$\text{Buffer Capacity for } SO_2 = m_{soln} \times C_B \times x_{DAS}$$

where buffer capacity is expressed in appropriate units of moles-per-unit time. DAS can react to absorb $SO_2$ whereas ABS is not useful for $SO_2$ absorption.

Description of Test Apparatus (FIG. 1)

A pilot scale apparatus as shown in FIG. 1 was used to test aspects of the disclosed invention. The apparatus included a feed gas mixing system, a "Venturi Scrubber-type" model absorber, a tail gas scrubber, and instrumentation to measure and control feed/product flows and temperatures. The feed gas bottles of $H_2S$, $NH_3$ and $N_2$ were placed on scales and included pressure control and flow measurement instrumentation. The feed gasses were fed through electric heaters H-50 and H-60 and combined with a feed steam line. The combined gas was then fed to the J1 Eductor. The feed solution was placed in TK-102 on a scale and heated by heating coil E-70. The feed solution was pumped to Eductor J1 via pump P-10. The liquid and vapor from Eductor J1 enter the Vapor/Liquid Disengagement Tank TK-101 with the liquid then draining to the Product Tank TK-103. The vapor produced from Eductor J1 flows to the tail gas Scrubber V-101 to capture any unabsorbed $H_2S$ and $NH_3$. The Tail Gas Scrubber V-101 is fed a circulating, pre-prepared buffer solution from TK-105. The buffer solution recirculates in the Tail Gas Scrubber V-101 via Pump P-20. At the end of a test run, the Tail Gas Scrubber is then drained to the Scrubber Effluent Tank TK-104. Effluent gas from the Tail Gas Scrubber is vented to a building scrubber.

Description of the Apparatus for Implementing the Invention

Figure 2:
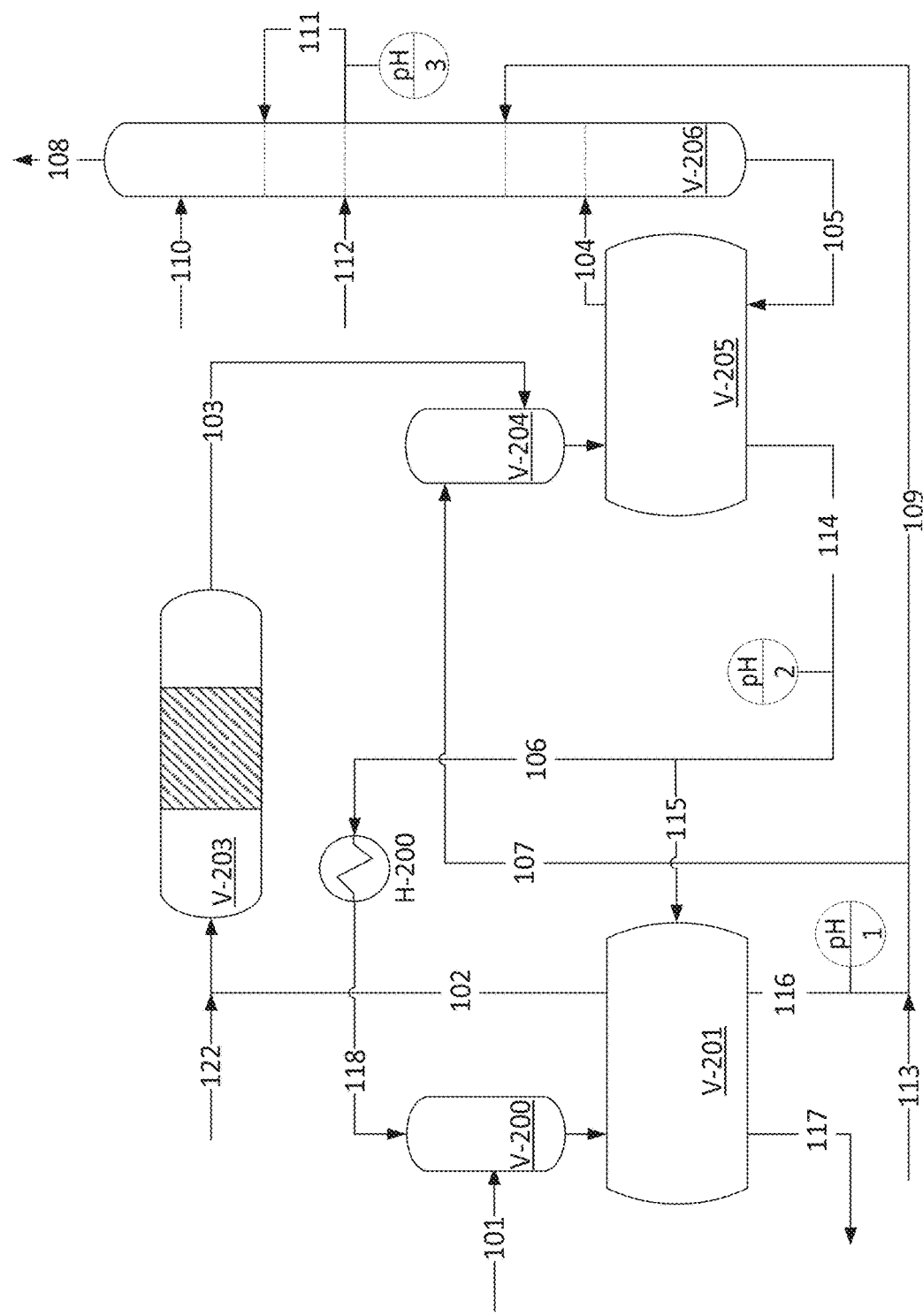
FIG. 2 is a simplified schematic illustrating the process of this invention.

The function of this invention is to sufficiently separate hydrogen sulfide from ammonia from a mixed feed gas in a single stage, First Co-current Contact Stage (V-200) using a sulfite-bisulfite containing solution. The co-current contact stage can be comprised from a venturi contact stage, co-current static mixer or other similar single stage reactor. FIG. 2 shows a preferred embodiment of the process in schematic form. The central feature of the process of this invention is the preferential and substantial absorption of the feed gas ammonia to convert ABS to DAS along with a portion of the feed gas hydrogen sulfide that converts a portion of ABS/DAS to ATS in the First Co-current Contact Stage. The quantities of ammonia and hydrogen sulfide absorbed into solution depend on several independent control variables such as absorbing solution pH and temperature, gas and absorbing liquid flow rate, and concentration of the ABS and DAS entering the contact stage. Conditions are controlled to reject sufficient hydrogen sulfide for subsequent combustion to sulfur dioxide that is used to replenish ABS consumed in the First Contact Stage. The $SO_2$ produced from the rejected $H_2S$ is then re-combined with the absorbed ammonia from the First Co-Current Contact stage in a second reaction zone to produce sulfite reagent required for the ATS reaction.

Fresh reagent "make-up" water is added to a final counter-current gas/liquid contact stage (referred to as a Vent Scrubber) just prior to the point of discharge of the benign-inert process gasses to the environment. There are three important process functions that the Vent Scrubber serves: (1) Added water is required to control the ATS Product dissolved ammonium salt concentration. In the preferred embodiments, most of the required water is added to the Vent Scrubber since its liquid effluent transfers into the ATS process' circulating streams and becomes part of the ATS Product leaving the system; the quantity of make-up water added is controlled to provide the optimal solution density of the product. (2) Water added to the Vent Scrubber also serves to recover and prevent loss of $SO_2$ for production of ABS/DAS buffer. Any $SO_2$ that passes into the Vent Scrubber is recovered and returned to the process as buffer reagent. (3) Counter-current addition of make-up water in the Vent Scrubber, coupled as required with addition of an external source of $NH_3$, prevents discharge of $SO_2$ to the environment. The solutions in the Vent Scrubber, being minimally buffered, are sensitive to small quantities of sulfur dioxide in the passing gas stream; to prevent $SO_2$ from being emitted to the environment, ammonia may be added to the make-up water in the Vent Scrubber's gas/liquid contacting zones. The vent scrubber pH is maintained at a relatively higher pH of 6.0 or higher in order to prevent $SO_2$ emissions to the atmosphere.

Detailed Description of FIG. 2: In a simplified, non-limiting embodiment, FIG. 2 schematically depicts details of a process within the scope of this invention. The feed gas to be treated is stream 101. Stream 101 is comprised of $H_2S$ and $NH_3$ gas with some amount of non-reactive gases such as $CO_2$ or water vapor. Stream 101 is first contacted in the first gas-liquid stage, V-200, with liquid stream 118. The temperature of stream 118 is controlled for optimum absorption of $NH_3$ while limiting absorption of $H_2S$ according to the methods of this invention, by first passing stream 106 through a heat exchanger, typically using air or cooling water as the cooling medium; if required, the medium may be changed to provide heating. Stream 106 is a relatively lower pH stream containing a relatively high buffer strength, for example $C_B$>6.0 wt. %, a portion of which is consumed by absorbed $H_2S$ to make ATS while another portion of the buffer's ABS is converted to DAS by absorbed $NH_3$. The Stream 106/118 pH is measured using a temperature-compensated process pH analyzer (pH-2). The liquid leaving V-200 falls into vessel V-201 having a higher pH and with a higher ratio of DAS:ABS: it is then combined with stream 115. A portion of the solution leaving V-201 is removed as the aqueous ATS liquid product of the process as stream 117 with the balance of the liquid exiting as stream 116. The pH of stream 116 is elevated relative to stream 114 and its pH is measured using a temperature compensated process pH analyzer (pH-1). Changes in the differential of pH measurements by pH-1 and pH-2 may monitored as a measure of changes in the buffer strength of the circulating solutions according to methods of this invention; an increase in the measured difference between pH-1 and pH-2 indicates decreasing buffer strength whereas a decrease in the differential indicates increasing buffer capacity; decreasing buffer concentration can be corrected by adding a flow of pure $H_2S$ via stream 122 to produce additional $SO_2$ and $NH_3$, either anhydrous or aqua ammonia, can be added to adjust Stream 122 to its target pH. The rejected $H_2S$ gas leaves V-201 as stream 102, which is fed to a burner, V-203, where $H_2S$ is oxidized to $SO_2$. Stream 116 leaving V-201 and carrying with it $NH_3$ recovered in V200, having a higher pH solution and higher ratio of Di-ammonium Sulfite, is split to provide stream 107 and stream 109. The $SO_2$ containing stream 103, is then fed to a second reaction zone, V-204 for contact with stream 107. In V-204, $SO_2$ reacts with DAS to create new ABS, lowering the pH of the solution that from V-204 into vessel V-205 where it is combined with stream 105. The solution leaves V-205 as stream 114. A portion of stream 114 is split as stream 106, according to the methods of the invention, to the first reaction zone V-200, with the balance flow comprising stream 115 being directed to V-201. Relatively small amounts of $SO_2$ and $NH_3$ gas in stream 104 feeds V-206 and are recovered by first scrubbing with stream 109 solution in a lower scrubbing section and then scrubbed with fresh make-up water in a second, upper scrubbing section. The scrubbing solution collected and leaving the bottom of vessel V-206 as stream 105 is a relatively dilute mixture of ATS, ABS AS, and water and is combined with the V-204 effluent and providing the proper degree of dilution, ultimately to achieve the proper final concentration of the ATS Product leaving as Stream 117. Stream 110 is a make-up water stream fed to V-206 in a quantity that controls the density/concentration of the circulating and product solutions and therefore, final ATS Product concentration. Stream 108 is clean treated gas for discharge to the environment. Stream 111 is a circulation loop of mostly clean water to monitor pH to achieve optimum control of emissions. The pH of Stream 112, referred to as the "upper pump around loop" is controlled with relatively small quantities of additional $NH_3$ (aqua or anhydrous) for the purpose of ensuring that the solution in the upper pump-loop has adequate capacity for neutralization of any $SO_2$ in the gas before it is vented to the environment as stream 108.

Figure 3:
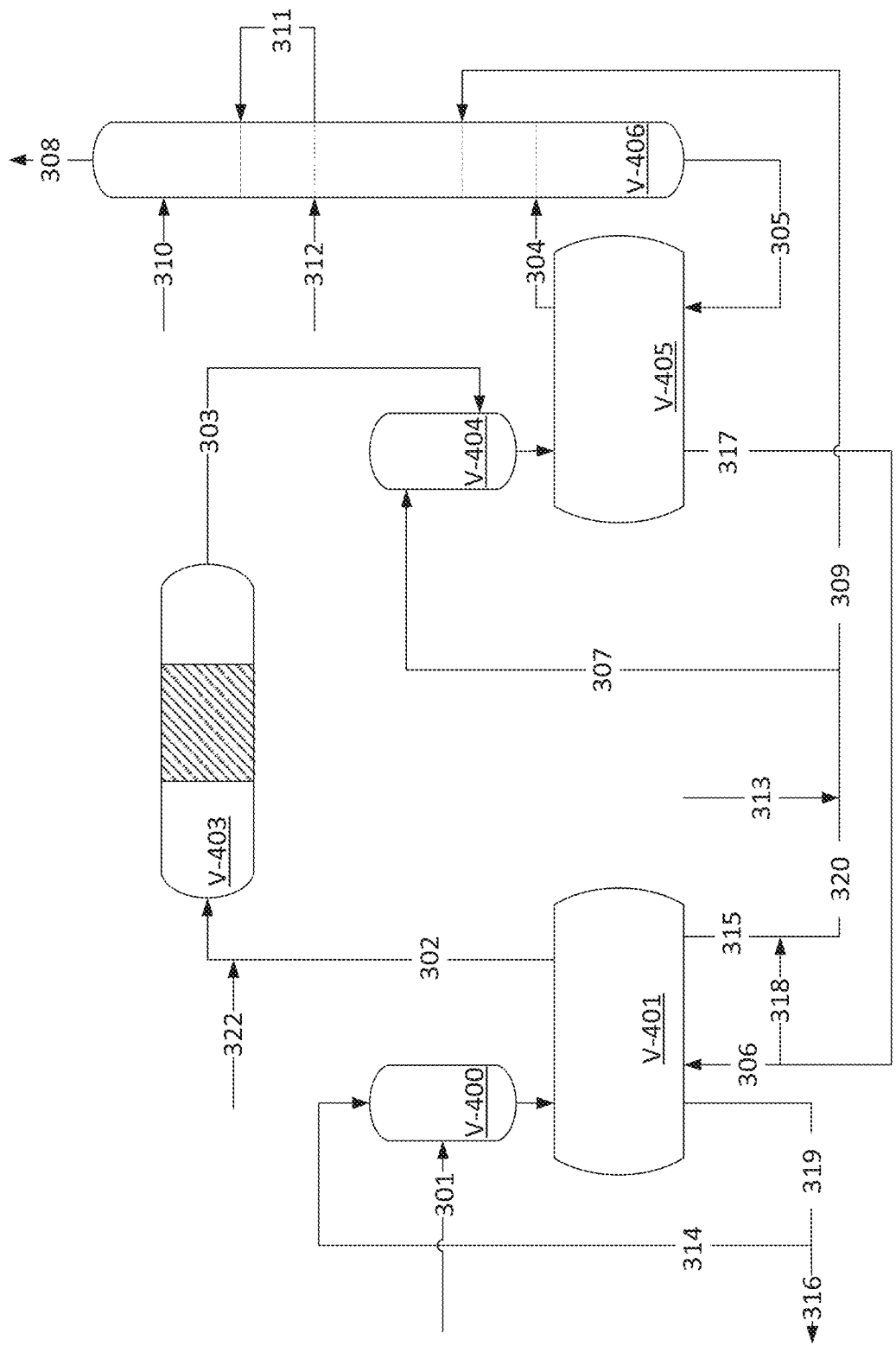
FIG. 3 is a simplified schematic illustrating the process of this invention with a modification to the liquid flow configuration of the first gas-liquid contact stage

Detailed Description of FIG. 3: In another non-limiting embodiment, depicted in FIG. 3, Stream 317, containing an ABS-rich solution resulting from the second gas-liquid contact stage is split as stream 306 in a quantity dictated by practice of the methods of this invention and admitted into V-401 with balance of the solution being directed to and mixed with solution leaving V-401 to produce stream 315.

The solution in stream 306 mixes with the liquid in V-401. A portion of the solution leaving V-401 as stream 314 is pumped, with a small portion having been withdrawn from Stream 319 as the liquid ATS Product of the process, to V-400. V-400 is the co-current first gas-liquid contact stage as the first liquid stream where it is brought into contact with stream 301, the first gas stream. The gas-liquid mixture leaves V-400 and falls into V-401. Liquid leaving V-401 as Stream 315, in a quantity similar in size to V-401's feed Stream 306, exits and is combined with stream 318 to become stream 320.

The FIG. 3 configuration distinguishes itself from that of FIG. 2 in that the effluent of the first contact stage is mixed with the liquid contents of V-401, a portion of which is recirculated back to V-400 as stream 314; that is, the first liquid stream contains material that has been previously processed through the first gas-liquid contact stage. In this configuration, the pH of stream 314 is higher than that of the similar stream 118 from FIG. 2. The higher pH of the liquid feeding the first gas-liquid contact stage leads to some reduced effectiveness for ammonia absorption over the process of FIG. 2. Importantly, the effect of recycling material to the first gas-liquid contact stage results in increased conversion of $H_2S$ to ATS over the process depicted in FIG. 2. The resulting paucity of $H_2S$ in the gas leaving the first gas-liquid contact stage, ultimately as stream 302, renders it difficult to satisfy the minimum requirements defined by the $1^{st}$ Gas $H_2S$ Rejection/Absorption Ratio equation. Whenever this is true, the quantity of ABS required to maintain steady-state operations cannot be produced from the quantity of $H_2S$ in stream 302 and the required amount may be supplemented from an external source such as shown by stream 322, usually a flow of pure $H_2S$. The inclusion of $H_2S$ from and external supply will normally, by material balance, necessitate further addition of ammonia, either as a liquid or gaseous supply such as shown with Stream 313. In the event that these external reagent requirements are acceptable to the practitioner of this invention, the configuration does provide a benefit to product stream 316, namely that its higher conversion to ATS and elevated pH relative to that of stream 117 in the configuration of FIG. 2 and may provide a commercially acceptable ATS Product solution that does not require further processing.

The balance of the configuration depicted in FIG. 3, namely $H_2S$ oxidation in V-403, $SO_2$ absorption in V-404, absorbing solution recycle from V-405, and effluent gas scrubbing in V-406, is substantially similar to that of FIG. 2.

Figure 4:
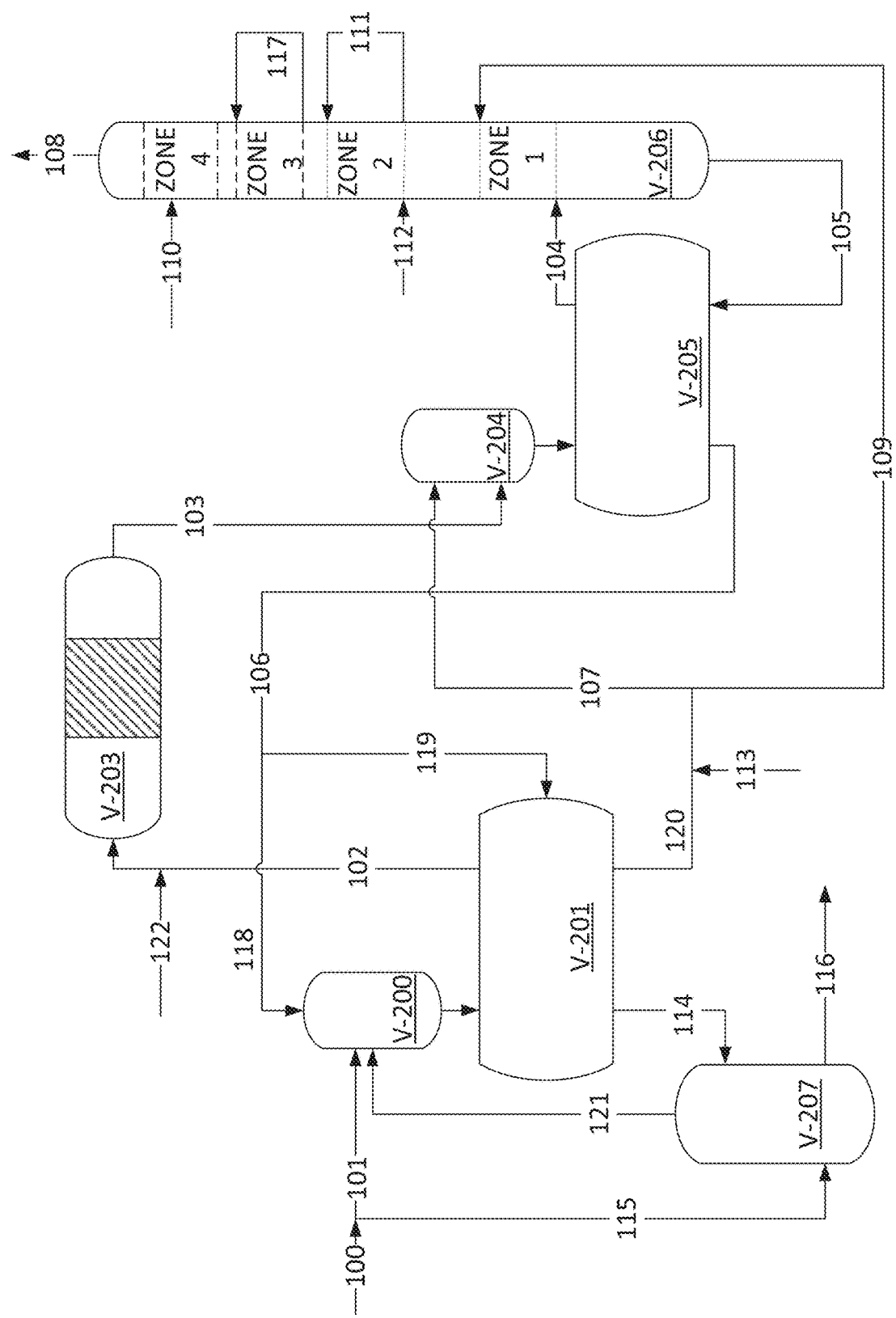
FIG. 4 is a simplified schematic representation of the apparatus shown in FIG. 2, but with the inclusion of a finishing column to create a higher concentration ATS product.
Figure 5:
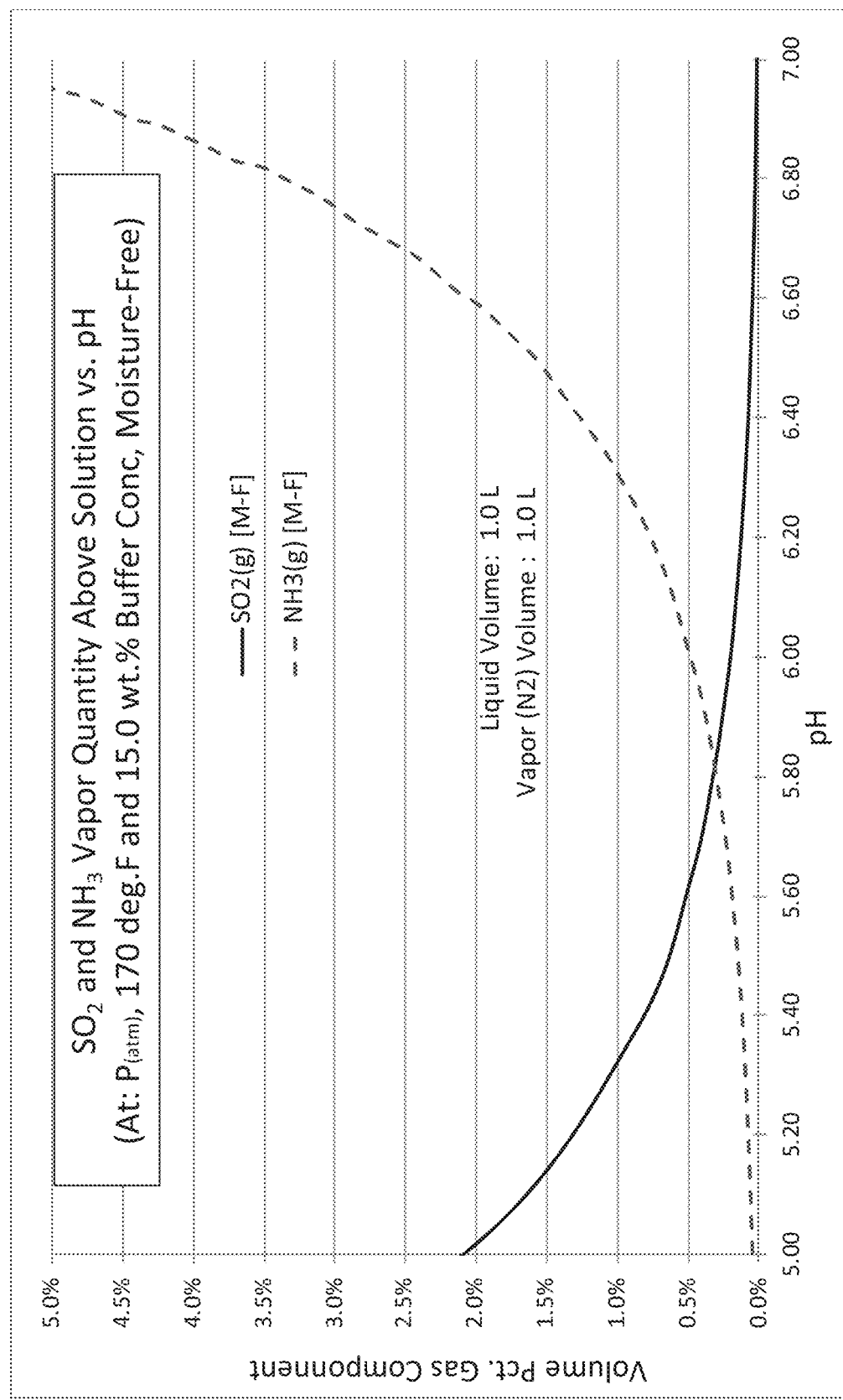
FIGS. 5-8 illustrate the pH and buffer concentration dependence upon the concentration of $NH_3$ and $SO_2$ over 77° C. buffer solutions of ABS/DAS
Figure 6:
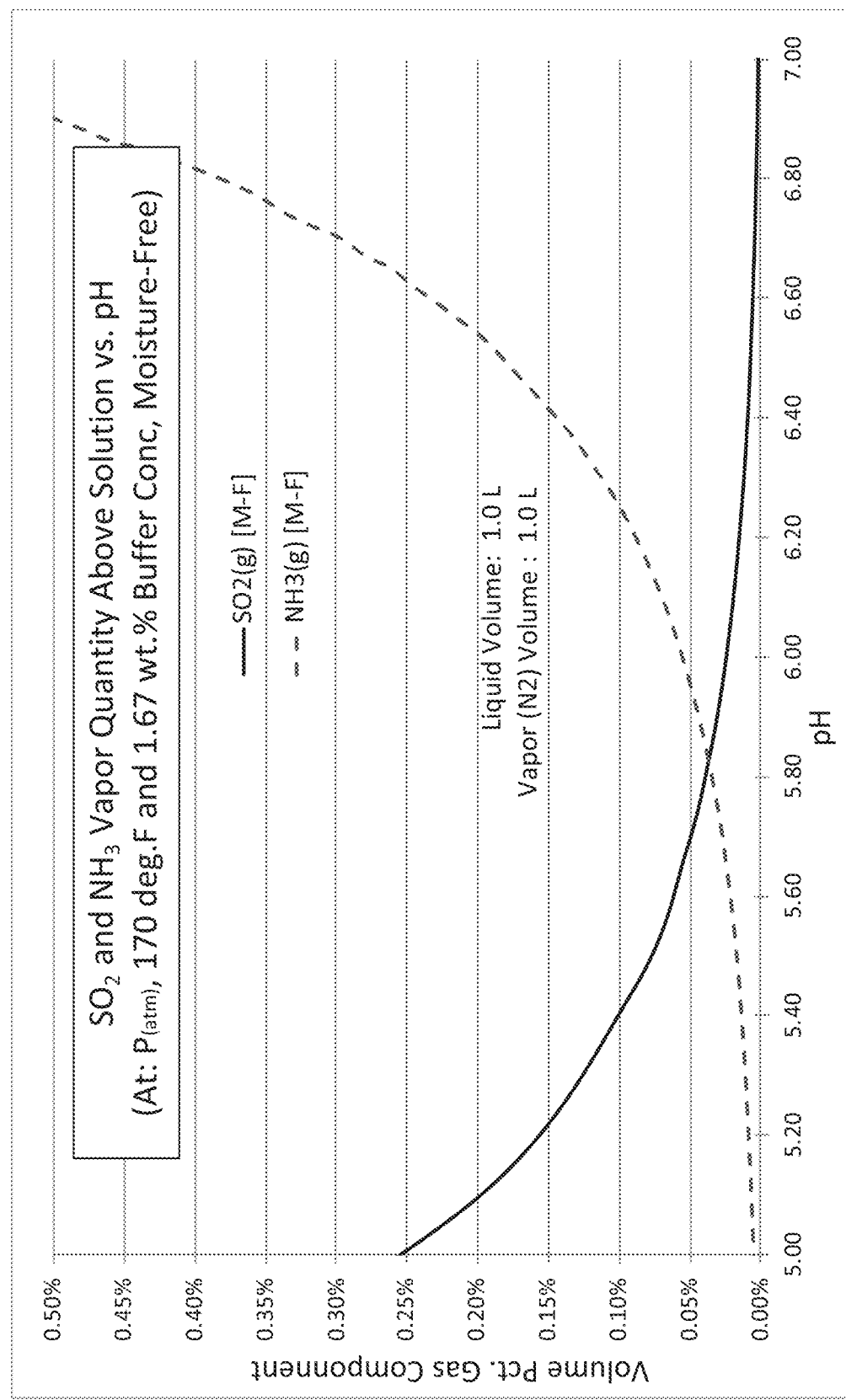
Figure 7:
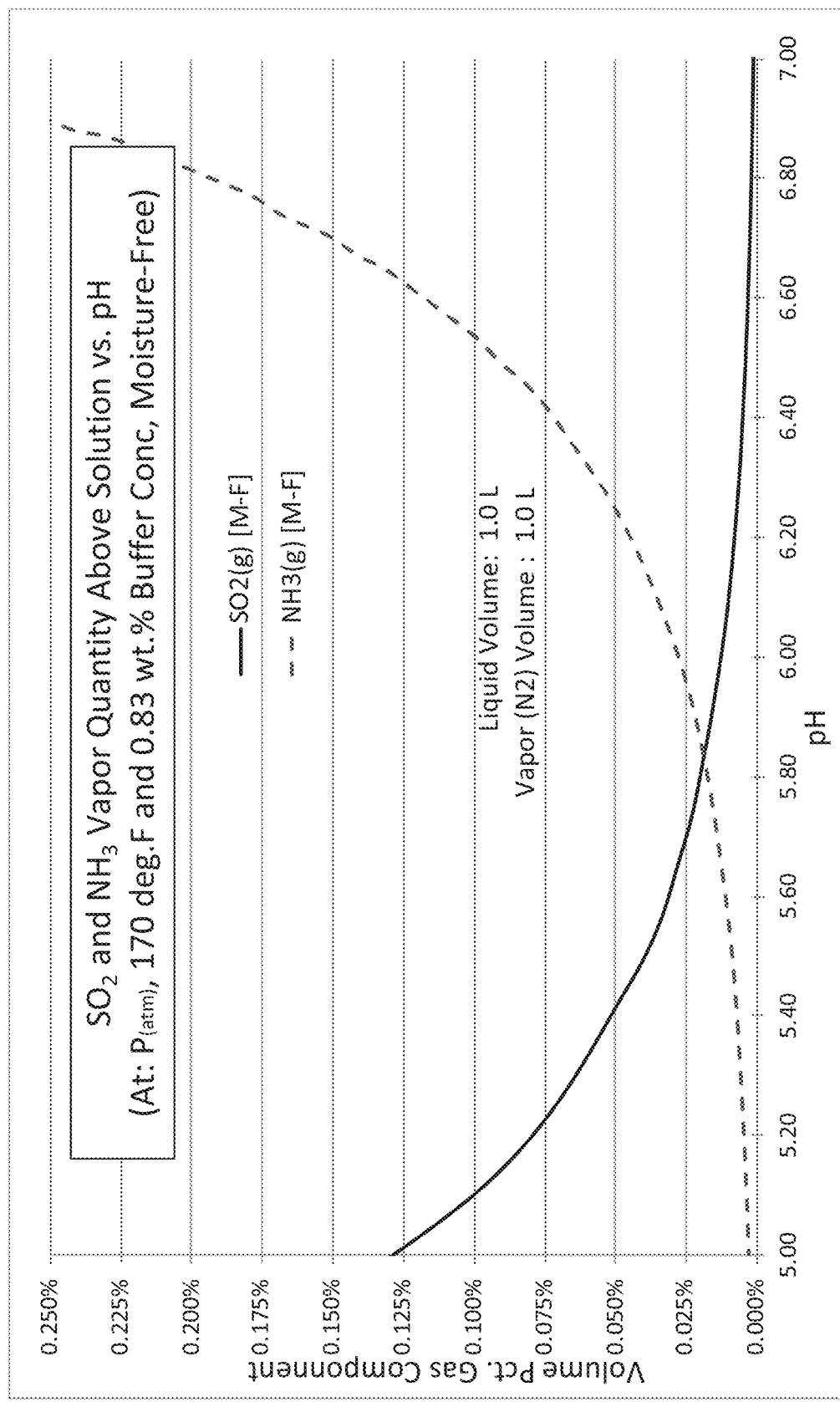
Figure 8:
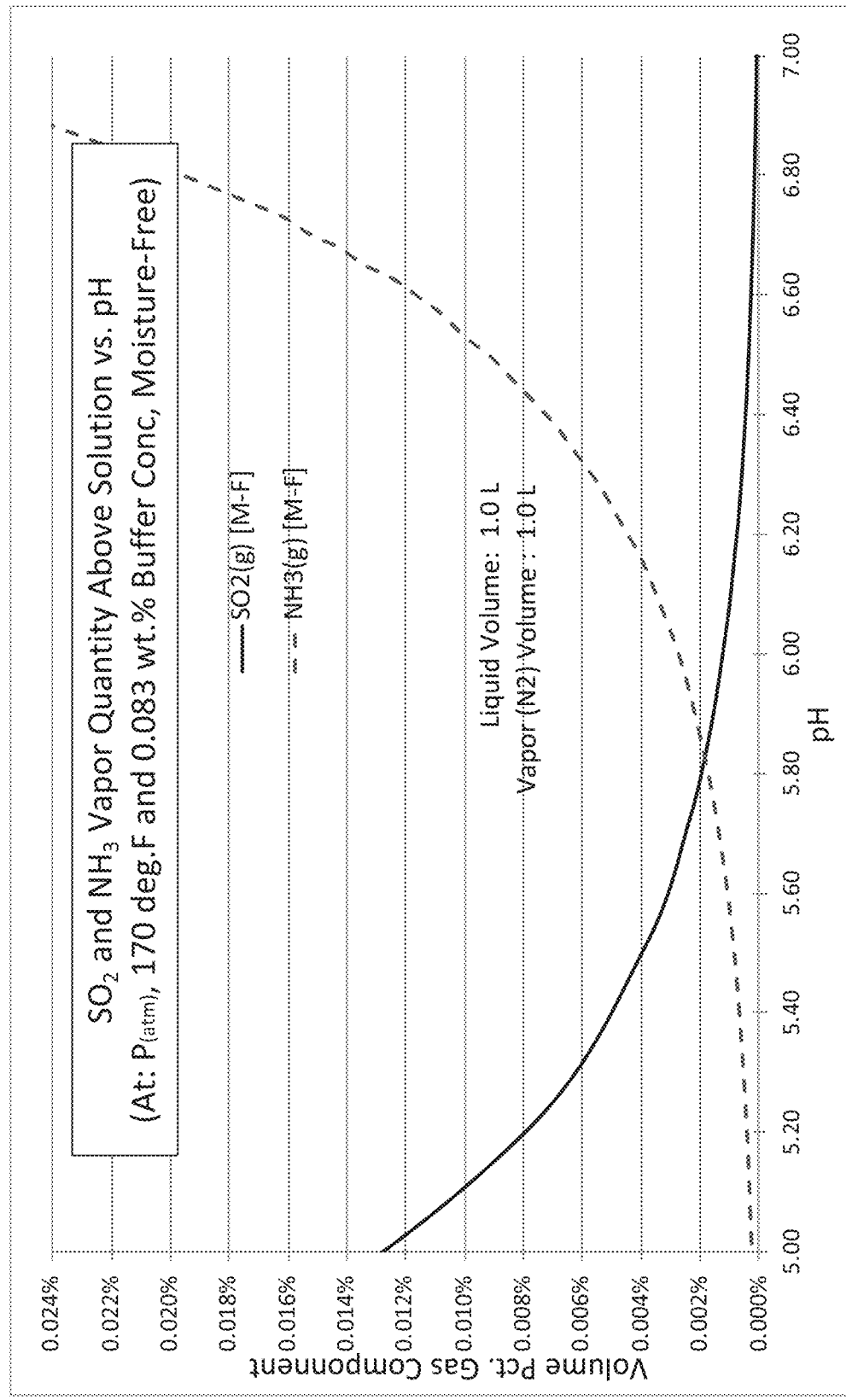

Detailed Description of FIG. 4: Another non-limiting embodiment is depicted in FIG. 4. The process depicted in FIG. 4 shares many similarities with FIG. 2, but with the inclusion of a finishing stage, V-207, that modifies and improves the final ATS Product solution by reducing the buffer concentration and increasing the ATS content in the solution. The type of equipment used as V-207 can be chosen as from a variety of typical co-current or counter-current gas-liquid contacting systems based upon engineering judgment of the designer. Another difference in FIG. 4 relates to improved gas scrubbing in V-206.

In the FIG. 4 embodiment, Stream 100 splits into Stream 101 and 115. Stream 101, similar to FIG. 2, is fed to the co-current gas-liquid contact stage V-200. The much smaller Stream 115 is directed to V-207, the finishing gas-liquid contact stage, where it is contacted with absorbing solution from Stream 114. Stream 114 is liquid from V-201, which has nominally the same composition as it does in FIG. 2. Stream 116 has a low sulfite buffer concentration liquid resulting from the contact of Stream 114 and 115 in V-207. Un-absorbed feed gasses leaving V-207 are directed to V-200 for further contact with the absorbing liquid from Stream 118.

Environmental Control of Process Gas Effluents

Control of the environmentally polluting effluents, $NH_3$ and $SO_2$, leaving the process of this invention are strongly dependent upon the understanding of the relationships between pH, temperature, and buffer concentration. The liquid-gas mixture leaving the $2^{nd}$ gas-liquid contacting stage, where $SO_2$ has been absorbed into an $NH_3$-rich liquid, are hot; typically, between 90° C. and 105° C. The pH is also normally below 6.0, and preferably between 5.5 and 5.7, and the buffer concentration is normally between 6 wt. % and 15 wt. %. Such solutions will exhibit significant concentrations of either $NH_3$, $SO_2$, or both in the vapor above the solution.

The FIGS. 5-8 illustrate the pH and buffer concentration dependence upon the concentration of $NH_3$ and $SO_2$ over 77° C. buffer solutions of ABS/DAS.

Using this dataset as an example, a typical $2^{nd}$ gas-liquid contact stage liquid with a "neat" pH of 5.6 will express a 0.5 vol. % $SO_2$ vapor concentration in equilibrium with the liquid; far above what could be allowed for release to the environment. Through methods described further by the methods this invention, the design of a vent-gas scrubber can efficiently and effectively reduce the $SO_2$ concentration to less than 10 ppm at the vent-gas scrubber exit.

Calculation of Required $H_2S$ Rejection/Absorption Ratio in $1^{st}$ Gas-Liquid Contact Stage The fractional quantity of the feed gas $H_2S$ to absorb in the $1^{st}$ gas-liquid contact stage for producing ATS-alone is ⅓ of feed $H_2S$ absorbed with ⅔ being rejected. However, since the dissolved components in the product solution of this invention also include other dissolved oxo-sulfur species, namely ABS, DAS, and ammonium sulfate (AS), it follows that the optimal fractional quantity of feed gas $H_2S$ to absorb in the $1^{st}$ gas-liquid contact stage will always be less than ⅓ of the $H_2S$ entering the process with the feed. The exact ratio of Absorbed-$H_2S$:Rejected-$H_2S$ in the $1^{st}$ gas-liquid contact stage is dependent upon both controlled and uncontrolled variables that affect the final composition of the product solution exiting the process. For typical conditions, with the objective of minimizing process requirements for external sources of either $NH_3$ or $H_2S$, it is generally preferred that between 68 to 74 mol % of the feed $H_2S$ is rejected for subsequent oxidation. The general equation for the portion of $H_2S$ fed the contact stage that must be rejected to the effluent for oxidation to $SO_2/SO_3$ is based upon the composition of the liquid effluent ATS/ABS/AS-containing solution, in order to produce such solution is:

$$\frac{\text{mols } H_2S \text{ in } 2^{nd} \text{ Gas}}{\text{mols } H_2S \text{ absorbed into } 1^{st} \text{ Liquid}} = 1^{st} \text{ Gas } H_2S \frac{\text{Rejection}}{\text{Absorption}} \text{Ratio}$$

$$1^{st} \text{ Gas } H_2S \frac{\text{Rejection}}{\text{Absorption}} \text{Ratio} = \left[ \frac{4/3\left(\frac{C_{ATS,mass}}{MW_{ATS}}\right) + \left(\frac{C_{B,mass}}{MW_{ABS}}\right) + \left(\frac{C_{AS,mass}}{MW_{AS}}\right)}{2/3\left(\frac{C_{ATS,mass}}{MW_{ATS}}\right)} \right]$$

where in the $1^{st}$ Gas $H_2S$ Rejection/Absorption Ratio equation: $C_{ATS,mass}$, $C_{B,mass}$, and $C_{AS,mass}$ is in units of mass of solute-per-mass of aqueous solution, MW is molecular weight of each in consistent units.

Implications and Outcomes Indicated By the Rejection/Absorption Ratio Equation Include:

Low Feed Gas $NH_3:H_2S$ Ratio: In the case where the molar content of $NH_3$ in $1^{st}$ gas feed stream is lower than the stoichiometric requirement for all aqueous oxo-sulfur anions, and the actual Rejection/Absorption ratio is greater than the calculated requirement, then either an additional, separate supply of $NH_3$ to make-up for the shortfall is required, or a sufficient portion of the excess quantity of $H_2S$ must be removed from the stream that is to be oxidized.

When the actual Rejection/Absorption ratio is less than calculated optimum ratio, then insufficient ABS will be produced to sustainably satisfy the ATS reaction stoichiometry from the $1^{st}$ gas feed stream alone. The concentration of ABS in the circulating solutions of the present invention will fall toward zero unless additional ABS is either made or added to the process. When the actual ratio is greater than the calculated optimum, then ABS will be produced in excess of the requirement to satisfy the ATS reaction stoichiometry, and the concentration of ABS in the process circulating solutions will increase over the course of operation.

In the case where there is insufficient $H_2S$ in the $2^{nd}$ gas stream to satisfy the $1^{st}$ Gas Rejection/Absorption ratio, the shortfall of $H_2S$ may be satisfied with the addition of a separate supply of $H_2S$ fed into the $2^{nd}$ gas stream, or, a separate supply of aqueous ABS may be equivalently added to, preferably, the $1^{st}$ liquid stream.

Under certain operating circumstances, e.g., low pH <5.3, other oxo-sulfur compounds can be present, such as higher thionates (HT). If there are other such components evident in the product, the equation may be modified to accommodate additional terms according to the stoichiometry of formation, its mass concentration and its MW. In an example, using a nonspecific compound, the $1^{st}$ Gas $H_2S$ Rejection/Absorption Ratio equation is easily modified to accommodate additional solution components as follows:

$$1^{st} \text{ Gas } H_2S \frac{\text{Rejection}}{\text{Absorption}} \text{Ratio} = \left[ \frac{4/3\left(\frac{C_{ATS,mass}}{MW_{ATS}}\right) + \left(\frac{C_{B,mass}}{MW_{ABS}}\right) + \left(\frac{C_{AS,mass}}{MW_{AS}}\right) + \left(\frac{C_{HT,mass}}{MW_{HT}}\right)}{2/3\left(\frac{C_{ATS,mass}}{MW_{ATS}}\right)} \right]$$

where: $C_{HT,mass}$, is the concentration of an arbitrary ammonium oxo-sulfur compound in kg-HT/kg-solution and $MW_{HT}$ is the molecular weight of the same.

Process Flow: Features of the process of this invention, to be described further below, will be exploited and integrated into a sustainable ATS—producing process that is generally applied as follows:

A portion of the $1^{st}$ liquid stream, the size of which is dictated by the methods of this invention, containing an ABS-rich mixture of ABS and DAS is introduced to the $1^{st}$ gas-liquid contact stage. The balance of the $1^{st}$ liquid stream is directed to the effluent of the $1^{st}$ gas-liquid contact stage.

At the point of $1^{st}$ gas feed stream introduction, substantially all feed ammonia is reactively absorbed into the $1^{st}$ liquid stream solution, using co-current gas-liquid contacting equipment, such as a venturi fume scrubber or static mixer, converting a portion of its ABS to DAS, enriching its concentration with newly-formed DAS.

Hydrolysis of $NH_3$ with ABS: $NH_{3(aq)}+ABS \leftrightarrows DAS$     (1)

Simultaneously with $NH_3$ absorption, a $1^{st}$ portion of $H_2S$ in the first gas feed is absorbed into the $1^{st}$ liquid stream solution, with the degree of absorption controlled by the methods of this invention, to satisfy the stoichiometric requirements defined by the "$1^{st}$ Gas $H_2S$ Rejection/Absorption Ratio" equation. The liquid effluent from the $1^{st}$ gas-liquid contact stage comprises the $2^{nd}$ liquid stream buffer solution. The absorbed $H_2S$ is hydrolyzed as ammonium bisulfide, AHS, within the $1^{st}$ contact stage by consuming an equal-molar portion of DAS in the $1^{st}$ liquid stream buffer solution, converting the portion of DAS to ABS.

Hydrolysis of $H_2S$ with DAS: $H_2S+DAS \rightarrow AHS+ABS$     (2)

The hydrolyzed sulfide reacts with two equal-molar portions ABS in the $1^{st}$ liquid stream buffer solution to produce ammonium thiosulfate.

ATS Reaction $1^{st}$ contact stage: $AHS+2\ ABS \rightarrow 1.5\ ATS+1.5\ H_2O$     (3)

The solution leaving $1^{st}$ gas-liquid contact stage is combined with the unused portion of the $1^{st}$ liquid stream solution, becoming the $2^{nd}$ liquid stream buffer solution. The $2^{nd}$ liquid stream buffer solution is rich in DAS as compared to the $1^{st}$ liquid stream buffer solution owing to absorption of $NH_3$ from contact with the $1^{st}$ gas feed. The quantity of newly-formed DAS in the $2^{nd}$ liquid stream solution will have been partially depleted by reaction with the absorbed portion of $H_2S$ from the $1^{st}$ gas feed.

The gas phase that exits the $1^{st}$ contact stage contains the non-absorbed portion of $H_2S$ from the feed gas, and leaves as $2^{nd}$ gas stream that has been substantially depleted of the feed gas $NH_3$.

Hydrogen sulfide in the $2^{nd}$ gas stream leaving the $1^{st}$ gas-liquid contact stage is then oxidized in a reaction furnace, providing a $3^{rd}$ gas stream, comprised predominantly of $SO_2$, water vapor and unreacted air. The $3^{rd}$ gas stream is then combined with the DAS-enriched $2^{nd}$ liquid stream buffer solution in a $2^{nd}$ gas-liquid contacting stage. The $SO_2$ in the $3^{rd}$ gas stream is absorbed into the $2^{nd}$ liquid stream buffer solution and hydrolyzed in an acid-base neutralization with an equal molar quantity of DAS to form a two-molar quantity of ABS in solution.

$$SO_2 \text{ Hydrolysis to ABS: } SO_2 + DAS \rightarrow 2\ ABS \qquad (4)$$

The solution leaving the $2^{nd}$ gas-liquid contact stage has a composition that matches the quantities of ABS and DAS that comprise the $1^{st}$ liquid stream buffer solution.

The solution leaving the $2^{nd}$ gas-liquid contact stage, comprising the $1^{st}$ liquid stream buffer containing solution is directed the $1^{st}$ gas-liquid contacting zone, completing a recirculating ABS/DAS-containing buffer solution recycle loop and the process continually repeats from (a) above.

Exiting the recirculating process, by principles of material balance, a portion of the $2^{nd}$ liquid stream must be withdrawn as a $3^{rd}$ liquid stream as the intermediate or final product of the process of this invention. The $3^{rd}$ liquid stream product will typically have a buffer concentration of between 5 wt. % and 10 wt. %.

A separate, optional $3^{rd}$ gas-liquid contact stage can serve to refine the $3^{rd}$ liquid stream to provide an improved product to by lowering the buffer concentration and increasing the final product ATS concentration by contacting the product with a small portion of the $1^{st}$ feed gas. Sufficient $1^{st}$ gas feed is added to the stage to reduce the buffer concentration to the typical agricultural product specification of between 1 wt. % and 2 wt. %.

A skilled practitioner of the methods of this invention should recognize that any deficiency found in the quantities of feed gas $H_2S$ or $NH_3$ required to satisfy the stoichiometry of the underlying chemical reactions may be supplemented with external supplies of the deficient component, either $NH_3$ or $H_2S$.

The gas stream leaving the $2^{nd}$ gas-liquid contacting stage, comprising a $4^{th}$ gas stream is composed substantially of nitrogen, oxygen, water vapor, and quantities of either or both $SO_2$ and $NH_3$; with $SO_2$ typically being the larger fraction. Depending upon the chosen set of conditions in the contact stage, the $SO_2$ may be present in small concentrations, but that nonetheless require removal before discharge to environment, or, the quantities may be large enough to be important to the process; that is, if the $SO_2$ leaving the $2^{nd}$ gas-liquid contact stage were not returned to the circulating $1^{st}$ or $2^{nd}$ liquid stream solutions, the criteria defined by the $1^{st}$ Gas $H_2S$ Rejection/Absorption Ratio equation would no longer be met and the process will fail due to insufficient buffer capacity.

Therefore, the $2^{nd}$ gas-liquid contact vapor effluent is normally directed to counter-current scrubbing, typically a packed or trayed tower, to remove $SO_2$ and $NH_3$ to trace quantities prior to being vented to the atmosphere; here referred to as a "Vent Scrubber". Pure water, required to provide for an aqueous ATS product, is generally added to the top of the Vent Scrubber so that it can act as a final gas-scrubbing agent. The design of the tower itself can follow any of a number of general chemical engineering guidelines. Scrubbing with water alone is ineffective since small quantities of $SO_2$ will significantly acidify pure water and much or most of the $SO_2$ will pass through.

To accomplish these objectives, an amount of $NH_3$, either as anhydrous or aqua-ammonia, is normally added in a section of the Vent Scrubber to provide a reactive and complete absorption of $SO_2$. The pH of the solution leaving the section where $NH_3$ is added is maintained in the range between about 5.8 and 6.6.

There are a number of preferred embodiments. One preferred embodiment includes four distinct gas-liquid contact zones:

Zone 1 (bottom): Trayed or packed section. A portion of DAS-rich $2^{nd}$ liquid stream solution is directed to the top of the contact zone and the $4^{th}$ gas stream flows counter currently through and exits toward Zone 2.

Zone 2 (lower-mid): Packed or trayed section and including a trap-tray and circulation pump. Anhydrous or aqua ammonia, is added to the circulating solution on pH feedback control. Solution, a dilute ABS-DAS solution, overflows the trap tray with the liquor supplementing the liquid feed to Zone 1. The $4^{th}$ gas stream leaves the stage toward Zone 3 and has, comparatively more $NH_3$ than $SO_2$. This section captures most of the $SO_2$ in the $4^{th}$ gas stream.

Zone 3 (upper-mid): Packed or trayed and including a trap-tray and circulation pump. Solution is very dilute and captures $NH_3$ and very small quantities of $SO_2$ in the vapor leaving. This section removes most $NH_3$ and $SO_2$ that would be considered important before environmental release. The further scrubbed $4^{th}$ gas stream then flows into Zone 4 and the very dilute liquor becomes the liquid feed to Zone 2.

Zone 4 (upper): Trayed section. Process make-up water is added to the top tray. Small, ppm-level quantities of $NH_3$ and $SO_2$ are absorbed as the $4^{th}$ gas stream flows counter currently to the liquid. The $NH_3$ and $SO_2$ are removed to very low concentrations since each are completely hydrolyzed into the make-up water.

Addressing the Consequences of Non-Stoichiometric Feed Gas Composition

The typical commercial feed gas to the process of the present invention will normally contain a stoichiometric excess of either $H_2S$ or $NH_3$ required to produce the quantity and composition of components in the concentrated ATS product solution. In the case where the feed is insufficient in $NH_3$ to satisfy the quantity of sulfur anionic species, there are two recommended choices:

1. Include the required supplemental ammonia from an additional supply stream of either anhydrous $NH_3$ or an aqua ammonia, or
2. Remove a portion of the $H_2S$-rich stream leaving the $1^{st}$ gas-liquid contact stage as a purge stream for processing separately in another process, such as a Claus Unit.

In the case where the quantity of $H_2S$ in the feed gas is stoichiometrically insufficient to produce the quantity of ABS required for ATS production, there are also two recommended means of addressing the deficiency:

1. Include a separate source stream of $H_2S$ to the $H_2S$-rich $2^{nd}$ gas stream effluent of the $1^{st}$ gas-liquid contact stage prior to oxidation to $SO_2$, or
2. Include a separate source stream of concentrated aqueous ABS to either the $1^{st}$ or $2^{nd}$ liquid streams in quantities that satisfy requirements to enable sustainable process operation.

Mass Transfer Considerations in the $1^{st}$ Gas-Liquid Contact Stage

The technical challenge presented in converting arbitrary mixtures of $H_2S$ and $NH_3$ to produce solutions of ATS in a from ABS/DAS containing solutions is that, in the $1^{st}$ gas-liquid contacting zone, sufficient $H_2S$ in the feed gas must be separated (rejected) while absorbing substantially all of the $NH_3$ in the feed gas. At the gas-liquid interface however, ABS/DAS containing solutions show no preference for absorbing and hydrolyzing either ammonia or hydrogen sulfide. The challenge is then to provide an environment within the $1^{st}$ gas-liquid contacting zone where $NH_3$ absorption is sufficiently preferred over $H_2S$. The innovations central to the process of the present invention are means to control and optimize individual $NH_3$ and $H_2S$ absorption mass-transfer rates and to specify the physical configurations of processing equipment that will allow for such control. The inventors point to the two-film model for gas-liquid mass transfer to provide insight.

Mass Transfer in the Gas Film. In dilute gas phase, the diffusion coefficient for $NH_3$ is larger than that of $H_2S$ by approximately one-order of magnitude. The principles of two-film gas absorption teach that $NH_3$ diffusing through an inert gas film will reach the gas-liquid interface at a higher rate than $H_2S$. The process of this invention takes advantage of the phenomena to create a mass-transfer environment that favors $NH_3$ absorption over $H_2S$ in the $1^{st}$ gas-liquid contacting stage.

Mass Transfer in the Liquid Film. The bulk liquid, containing ABS and DAS in varying quantities, can react with and hydrolyze both $NH_3$ and $H_2S$ as they are absorbed at the liquid surface, depleting these aqueous reagents in the vicinity of the liquid surface, creating a liquid film resistance around the bulk solution phase of a droplet. By principles of two-film theory, a liquid-phase film mass transfer resistance develops as ABS/DAS are consumed. The reaction exotherm of absorption will raise the temperature to the bubble point if the droplet of the solution is not already at the bubble point as it enters the contact stage. Water vapor is released by the droplet, enhancing the gas-film thickness about the droplet.

Methods of the Invention to Control of Individual $H_2S$ and $NH_3$ Mass Transfer Coefficients Gas-Liquid Contact Control—Co-current Gas-Liquid Flow Regime The critical step in the method of this invention centers within the $1^{st}$ gas-liquid contact stage and is premised on the requirement that the feed gas and liquid reagents are not allowed to achieve full chemical equilibrium. The objective in the $1^{st}$ gas-liquid contact stage configuration in the process of this invention is to bring the $1^{st}$ gas feed and $1^{st}$ liquid stream together in intimate contact concurrently under conditions that allow sufficient time to absorb substantially all of the feed gas $NH_3$ but not enough time to absorb more $H_2S$ than required to sustain the process's ABS production requirements. Of the three main reactions occurring in the $1^{st}$ gas-liquid stage,

  (1)

  (2)

  (3)

Only $NH_3$ absorption (1) is preferred to go to completion. By taking advantage of co-current contact and in combination with other methods of the disclosed invention, the processing objective of the $1^{st}$ gas-liquid contact stage can be achieved.

Effect of Temperature in $1^{st}$ Gas-Liquid Contact Stage

For the system where the feed gas is predominantly comprised of $H_2S$, $NH_3$, and $H_2O$ vapor, the effect of temperature is strong. Operation at higher temperature leads to higher concentrations of water vapor within the $1^{st}$ gas-liquid contact stage, increasing the gas-film thickness resistance to gas-phase mass transfer.

When feed temperature (either gas or liquid) is low enough to allow for condensation water vapor from the feed gas into the feed liquid within the contact stage, the gas phase mass transfer resistance is reduced since all three of main gas components will be condensing/absorbing into the liquid phase. The gas-phase absorption mass transfer coefficients for both $H_2S$ and $NH_3$ will be comparatively large during this condition since the gas-film will be very thin or non-existent.

The effect is counterbalanced, to varying degrees, depending upon specific conditions such as the liquid feed flow, ABS concentration, and temperature, owing the reaction exotherm when both $NH_3$ and $H_2S$ hydrolyze into solution and by the exotherm of the ATS reaction. The thickness of the gas film will increase as the reaction exotherm increases the temperature of the liquid to its bubble-point.

Increasing the feed liquid temperature to or above the bubble point of the droplet, for example, to 115° C. further enhances the gas-film resistance due to increased concentration of water vapor around the liquid in contact with the gas.

Effect of Liquid-to-Gas (L/G) Ratio

Increasing the feed L/G ratio increases absorption mass transfer mainly by reducing the liquid phase mass transfer resistance and supplies more sulfite buffer reagent for absorption per volume of feed gas fed, increasing the concentration of sulfite in the liquid-film and therefore reducing the liquid-phase mass transfer coefficient.

Changes in the feed L/G ratio change the absorption mass transfer rates for both $H_2S$ and $NH_3$, but not equally. For a given increase in the ratio, the effect of increased absorption is greater with respect to $NH_3$.

Effect of Buffer Concentration in $1^{st}$ Liquid Feed

The concentration of buffer (i.e., concentration of both ABS/DAS, expressed as ABS) was treated as an independent variable. Increases in buffer concentrations lead to increased concentrations of sulfite reagent in the liquid film and therefore increase the liquid-phase mass transfer coefficient for both $NH_3$ and $H_2S$ absorption, but the effect is greater for absorption of $NH_3$ relative to $H_2S$.

Effect of pH in $1^{st}$ Liquid Feed

In the range of pH for testing of the 1' gas-liquid contact stage, the pH of the first liquid absorbing feed solution had an effect on $NH_3$ absorption but showed no measurable effect on $H_2S$ absorption. Changes in the feed absorbing solution pH demonstrates an inverse relationship with mass transfer of $NH_3$ absorption. As the feed solution pH is decreased, $NH_3$ absorption increases.

$1^{st}$ Feed Gas $NH_3$:$H_2S$ Ratio

Absorption of $NH_3$ in the $1^{st}$ gas-liquid contacting zone exhibited a modest, but measurable inverse dependence on the ratio of $NH_3$:$H_2S$ in the $1^{st}$ feed gas. Higher $NH_3$:$H_2S$ ratios lead to modestly reduced $NH_3$ recovery. $H_2S$ absorption was insensitive to this ratio.

To compensate for changes in $NH_3$ recovery due to changes in this ratio, other of the independent process variables named here can be adjusted upward or downward.

Interactions Between Independent Variables

As expected, the main independent variables show independent effect, but also two-way and even three-way interactions were naturally incorporated into the experimental design. For example, it should be apparent that the effect of sulfite buffer concentration has a direct impact on gas absorption, but the effect of buffer capacity, the product of ABS concentration and feed liquid flow rate is a more meaningful measure and is a two-way interaction between independent variables. The form of the equations that were developed from testing takes this into account.

Example of Application to Mass Transfer Control

The following is a non-limiting example of how the methods of this invention may be applied to control individual mass transfer rates for absorption of $NH_3$ and rejection of $H_2S$ from a mixed feed. In this example the required $1^{st}$ Gas $H_2S$ Rejection/Absorption Ratio has been computed to be 2.7:1, meaning that about 73% of the feed $H_2S$ must be rejected from the $1^{st}$ gas-liquid contact stage and it is desired to absorb at least 95% of the feed $NH_3$ in the liquid. For this example, the values for "$H_2S$ Rejection" and "$NH_3$ Absorption" have been computed using the respective regression equations described in the "Laboratory Testing" section, below.

TABLE 1

| Effect of Change in Operating Conditions on $NH_3$ Absorption and $H_2S$ Rejection | Beginning Condition | Increase Temperature | Increase L/G Ratio | Increase Buffer wt % | Reduce pH | Increase L/G Ratio |
|---|---|---|---|---|---|---|
| Operating State | (0) | (1) | (2) | (3) | (4) | (5) |
| Wt. % Buffer as ABS | 7.0% | 7.0% | 7.0% | 10.0% | 10.0% | 10.0% |
| Liquid Feed Rate, (kg/h) | 92,000 | 92,000 | 137,000 | 137,000 | 137,000 | 145,000 |
| Gas Feed Rate, (Std. m³/hr) | 2,550 | 2,550 | 2,550 | 2,550 | 2,550 | 2,550 |
| L/G, (kg/h) ÷ (Std. m³/hr) | 36.1 | 36.1 | 53.7 | 53.7 | 53.7 | 56.9 |
| pH of Feed Liquid | 6.00 | 6.00 | 6.00 | 6.00 | 5.80 | 5.80 |
| Temperature Liquid Feed, (° C.) | 77 | 85 | 85 | 85 | 85 | 85 |
| $H_2S$ Rejection in 1st Contact | 66% | 86% | 80% | 74% | 74% | 73% |
| Δ($H_2S$) on Changed Condition | | 20% | −5% | −7% | 0% | −1% |
| $NH_3$ Absorption in 1st Contact | 87% | 57% | 75% | 87% | 95% | 99% |
| Δ($NH_3$) on Changed Condition | | −30% | 18% | 12% | 8% | 4% |

Table 1 depicts a progression of operating changes, proceeding from the left column to the right, where in the initial operating state, the "Beginning Condition", has a constant sour water stripper gas (SWSG) feed gas rate of 2,550 standard-m³/hr (SCMH) is fed to a first gas-liquid contactor (e.g., venturi fume scrubber) and where it contacts a liquid feed that has been co-currently sprayed into the reaction zone at 92,000 kg of absorbing solution per hour (kg/h), having a buffer concentration, $C_B$, expressed as 7.0 weight-percent of solution (wt. %), a feed temperature of 77 degrees Celsius (° C.), and an undiluted measured pH of 6.0. For this example, the SWSG feed is assumed to have an $NH_3$:$H_2S$ ratio of 1.0:1. The target feed gas $H_2S$ rejection in the $1^{st}$ Gas-Liquid contactor has been estimated by the Required $H_2S$ Rejection-Absorption Ratio equation, to be 73%. In this non-limiting example, to achieve the required $H_2S$ rejection and to maximize $NH_3$ absorption through application of the methods of this invention, one could follow a progression such as follows:

(0) In the Beginning Condition, the $H_2S$ rejection is lower than desired. Operators of the process would understand this since the buffer concentration would have been continuously decreasing. Also, $NH_3$ absorption is lower than desired, and operators would understand this since requirements for addition external $NH_3$ would be elevated.

(1) Advance to Operating State (1): Increase the operating temperature in order to increase the degree $H_2S$ rejection. The result is that $H_2S$ rejection is increased from 66% beyond its target value to 86% and $NH_3$ absorption efficiency has gotten worse with only 57% recovered into the liquid. At this time, operators would notice that the decline in buffer concentration had reversed and was now increasing, but the requirement for external $NH_3$ would have increased.

(2) Advance to Operating State (2): Operators increase the liquid rate to increase the L/G ratio to increase $NH_3$ absorption. The result is that $H_2S$ rejection is still above the target while $NH_3$ absorption has improved, but is still low, at 75% recovered.

(3) Advance to Operating State (3): Operators increase the buffer concentration to increase $NH_3$ absorption. The result is that $H_2S$ rejection has decreased, and though is still above target at 74%, the rate of change in buffer concentration would be very slow. $NH_3$ absorption has improved to 87% and would be indicated by a reduction in the requirement for external $NH_3$ addition.

(4) Advance to Operating State (4): Operators reduce the feed liquid pH to increase the $NH_3$ absorption. The result is the $H_2S$ rejection remains the same and slightly above its target value and $NH_3$ absorption has improved to 95% of the feed recovered into the liquid.

(5) Advance to Operating State (5): Further increase the liquid rate to increase the $NH_3$ absorption and slightly decrease $H_2S$ rejection. Operators would observe that the buffer concentration will be neither significantly rising nor falling, indicating that $H_2S$ rejection had decreased to the desired target value of 73% of the feed-$H_2S$. In this example, $NH_3$ absorption increased to 99% of the feed SWSG $NH_3$ being recovered into the liquid and operators would observe that the requirement for external $NH_3$ will have been minimized.

This above example has been presented to show only a single illustration of how the independent operating parameters may be adjusted to realize the objectives of the method of this invention. The pathways that the practitioner of this invention uses to achieve optimal $NH_3$ absorption and $H_2S$ rejection are numerous and are dependent upon the specific feedstock and configuration of equipment.

Method to Monitor Buffer Concentration/Capacity Using Process pH Instrumentation:

A standard means of monitoring buffer strength during operation of ATS-producing processes is via an analytical laboratory, wet-chemical, iodometric titration of a process sample. It is a labor intensive and time-consuming task where the analytical results may not be received by process operators in a timely manner. Although development of automatic online process analytical tools are available, such instruments are both very expensive and labor and maintenance intensive. It is, however, possible to use simple and inexpensive inline process pH instrument to indicate buffer concentration directly during process operation.

During operation, while applying the methods of this invention, and comparing the solutions entering both the first gas-liquid contact stage and that which is entering the second gas-liquid contact stage, the measured values of pH (see FIG. 2, "pH-1" and "pH-2", for reference) will differ due to their respective ratios of ABS:DAS. Since for a given constant first feed gas rate and composition, the pH of a solution with higher buffer capacity will exhibit a smaller change in pH when it leaves the stage than a that of a first feed solution with a lower pH, it can be inferred by the operator of the process, during continuous operation, that when the difference in pH mentioned above is increasing over the course of operating time, the buffer capacity in the first feed solution is decreasing.

Observation of this differential in pH can be used by the practitioner of the methods of this invention to identify changes in the performance of the process and apply measures according to the methods of this invention to adjust or correct the performance to achieve the desired results. The differential pH can also be incorporated into an automated action designed to raise or lower the buffer capacity of the circulating solutions by, as a non-limiting example, automatically modulating the flow of $H_2S$ to the oxidizer to provide either additional or reduced quantities of $SO_2$ for ABS production in the second liquid contact zone.

Environmental Controls

With decreases in pH, the equilibrium concentration of $SO_2$ in the vapor increases. The equilibrium concentration of sulfur dioxide over ABS-containing solutions, $SO_2$ is a function of: (1) Total sulfite concentration: As total sulfite concentration in solution increases, the equilibrium $SO_2$ in the vapor phase over the solution increases; (2) Solution Temperature: Increasing temperature increases $SO_2$ concentration in the vapor phase; and (3) Solution pH: As pH of solution is reduced, the equilibrium concentration of $SO_2$ in the vapor phase over the solution increases.

To absorb (capture into solution) substantially all $SO_2$, the equilibrium concentration of $SO_2$ over the absorbing solution must be sufficiently low so that $SO_2$ is not removed with the flowing gas stream as it leaves the process and is discharged to the environment. As required, the gas leaving the $2^{nd}$ gas-liquid contact stage passes through 2 to 4 additional gas-liquid contact zones arranged in a counter-current series whereby process make-up water is introduced to the last gas-liquid contacting stage.

(1) In one or more of the intermediate stages, as required, ammonia may be added to the stage to enhance $SO_2$ removal. The dilute ammonium sulfite solution formed in the contact stages passes back into the process and is ultimately combined with either the $1^{st}$ or $2^{nd}$ ABS/DAS containing solution.

(2) In the final gas/liquid contact stage before discharge to the environment, where both the total normality and sulfite concentrations are low (Tot Normality <0.01 mol/L) it is preferred that the pH of the contacting liquid is maintained above pH values of 6.3.

The type of gas-liquid contact stage for any, excepting the $1^{st}$ gas-liquid contact stage, can be any of the designs typical for gas-liquid absorption, including venturi-type spray contactors or counter-current contactors such as trayed or packed columns.

Laboratory Testing

Objectives. Laboratory engineering experiments were undertaken to gather data directed toward understanding absorption mass transfer of concentrated mixtures of $NH_3$ and $H_2S$ in Sulfite Solutions with the objective of determining the conditions that lead to a mass-transfer-rate differential between the absorption of ammonia and hydrogen sulfide.

Test Work: Apparatus and Independent Variables Measured. A pilot scale apparatus as shown in FIG. 1 was used to test aspects of the disclosed invention. The apparatus consisted of:

(1) Feed Gas Mixing System
(2) "Venturi Scrubber-type" model Absorber.
(3) Tail Gas Scrubber
(4) Instrumentation to measure and control feed/product flows and temperatures.

Absorption Kinetics Test Matrix: For this work, the largest block of tests were structured in a sixteen-run, $2^5$ one-half fractional factorial statistical experimental design (see Table 2, below). This particular matrix was chosen to allow for quantitative measurement of both main-effect variables two-way interactions between all of the independent variables.

TABLE 2

Direct Neutralization Test Matrix:

| Test # | Liquid (kg/h) | $H_2S$ (SCMH) | $NH_3$ (SCMH) | Nitrogen (SCMH) | Buffer (wt. %) | Steam (SCMH) |
|---|---|---|---|---|---|---|
| 1 | 0.115 | 1.46 | 1.46 | 0.00 | 14.0% | 1.70 |
| 2 | 0.191 | 1.46 | 1.46 | 0.00 | 8.0% | 1.70 |
| 3 | 0.115 | 1.94 | 1.46 | 0.00 | 8.0% | 1.70 |
| 4 | 0.191 | 1.94 | 1.46 | 0.00 | 14.0% | 1.70 |
| 5 | 0.115 | 1.46 | 1.94 | 0.00 | 8.0% | 1.70 |
| 6 | 0.191 | 1.46 | 1.94 | 0.00 | 14.0% | 1.70 |
| 7 | 0.115 | 1.94 | 1.94 | 0.00 | 14.0% | 1.70 |
| 8 | 0.191 | 1.94 | 1.94 | 0.00 | 8.0% | 1.70 |
| 9 | 0.115 | 1.46 | 1.46 | 5.10 | 8.0% | 1.70 |
| 10 | 0.191 | 1.46 | 1.46 | 5.10 | 14.0% | 1.70 |
| 11 | 0.115 | 1.94 | 1.46 | 5.10 | 14.0% | 1.70 |
| 12 | 0.191 | 1.94 | 1.46 | 5.10 | 8.0% | 1.70 |
| 13 | 0.115 | 1.46 | 1.94 | 5.10 | 14.0% | 1.70 |
| 14 | 0.191 | 1.46 | 1.94 | 5.10 | 8.0% | 1.70 |
| 15 | 0.115 | 1.94 | 1.94 | 5.10 | 8.0% | 1.70 |
| 16 | 0.191 | 1.94 | 1.94 | 5.10 | 14.0% | 1.70 |
| 17 | 0.153 | 1.70 | 1.70 | 2.55 | 11.0% | 1.70 |

Where: liquid is the absorbing solution flow rate in kilograms-per-hour, gas flows are in standard-cubic-meters-per-hour (SCMH), and Buffer is the total sulfite concentration expressed as ABS in weight-percent of the solution.

The features/characteristics of Table 2, Direct Neutralization Test Matrix are:

Main-Effect Independent Variables: Feed Liquor Flow Rate (to Scrubber); $H_2S$ Volumetric Flow Rate; $NH_3$ Volumetric Flow Rate; $N_2$ Volumetric Flow Rate; and Feed Liquor ABS Concentration.

Dependent Variables: $H_2S$ Absorption (measured vol. % absorbed) and $NH_3$ Absorption (measured vol. % absorbed)

Additional Tests Beyond Matrix Runs: Four replicate experiments at "center-point" conditions (Run #17) were included to provide a measure of statistical variance as well as detect non-linearity in the independent variable responses. One replicate of Run 2 (Run 2A) was performed with "cold" feed solution to measure the effect of temperature on mass transfer. The solution was fed at 51° C. instead of 85° C. as was the case for all other runs. One replicate of Run 17 was run with a higher-pressure (smaller orifice) spray nozzle. Six additional experiments were run two weeks later:

(1) Replicate of Run No. 4 as a measure, with new batch of feed solution experimental variability.

(2) Replicate of Run No. 4 with original feed material, as a measure experimental variability.

(3) Replicate of Run 4 (Run 104) at lower feed solution pH=5.1.

(4) Replicate of Run 3 (Run 103) at lower feed solution pH=5.1.

(5) Replicate of Run 6 (Run 106) at lower feed solution pH=5.1.

(6) Replicate of Run 17 (Run 117-5) at lower feed solution pH=5.1.

Operating Method:

Venturi Feed. In each experimental run, liquid and gas feed systems delivered feeds to the Venturi-type spray-absorber in a once-through fashion. Gas and Liquid feed stream concentrations and flow rates for testing had been calculated to be in the regions of normal plant operations. Feed gasses were mixed at 85° C. or above to prevent bisulfide plugging. For each run, feed liquids and gasses were fed for six-minutes. Effluent liquids were quickly sequestered away from the reaction gasses and sampled for titration assays. Feed and effluent liquid streams were weighed and assayed for: ATS and Buffer concentrations, pH, and specific gravity.

Tail Gas Scrubber. Effluent gasses from the Spray Contactor were fed to the Tail Gas Scrubber, consisting of: a 100 mm diameter, 2 m tall column packed with 1.75 m of 9.5 mm polypropylene Intalox packing and irrigated with 7.5 L/min of circulating, nominally 15 wt. % buffer-only-containing solution. Samples of Scrubber solution were taken before and after each run and assayed for buffer concentration and ATS to determine the quantities of $H_2S$ and $NH_3$ not captured in the Venturi scrubber. It was expected that no significant quantity of either $H_2S$ nor $NH_3$ will pass through the Tail Gas Scrubber without being absorbed.

Assay Measurements and Material Balance Analysis: Total Individual Gas Feed quantities for each run were measured both with flow meters and gravimetrically. Spray Scrubber Liquid and Tail Gas Scrubber feed and effluent liquid quantities were measured and assayed (by iodometric titration). A material balance around each run was computed to determine the disposition of the feed gas components.

Summary of Results:

Effect of Feed Liquor and Feed Gas Flow Rate. For data analysis, these independent variables were combined into one independent variable representing the liquid-gas-ratio. Numerically it was expressed as (L/G) or kg/h-per-SCMH. The effect on L/G ratio was significant for both $H_2S$ and $NH_3$ absorption. Increasing the L/G ratio leads to increased absorption of both, but the effect is stronger with respect to $NH_3$ absorption. The inventors attribute the increase in mass transfer mainly to an increase in the liquid-phase mass transfer coefficient.

Effect of Presence of Non-Condensable Gas in the Feed Gas. It was found that the presence of another non-condensable gas in the Venturi led to increased rejection of $H_2S$ in the Venturi scrubber. It was determined that the quantities used in the eight runs that included it was far too great, leading to much higher rejection than was anticipated. Though they demonstrated the effect of increasing the mass-transfer resistance, not much analysis time was devoted to these experiments. The inventors attribute the decrease in the mass transfer mainly to a reduction in the gas-phase mass transfer coefficient.

Effect of Feed Liquor ABS Concentration. Increasing the ABS concentration in the feed liquor leads to increased absorption of both $H_2S$ and $NH_3$, but the effect is greater for $NH_3$ over $H_2S$.

Effect of Spray Nozzle Type. In this test, a smaller diameter orifice was used to increase the atomization of droplets in the Venturi contactor to determine the effect on mass transfer. There was no measurable effect. No further work was done. The inventors acknowledge that the results of this single test are not definitive.

Effect of Feed Solution pH. The replicate test runs performed at nominally two different values of feed solution pH showed that $H_2S$ absorption mass transfer was relatively insensitive to variations in pH in the range between pH=5.0 and pH=5.7. A modest, but significant, effect on $NH_3$ absorption mass transfer was observed over the same range.

Effect of Feed Solution Temperature. In a pair of pilot-scale laboratory tests using the testing apparatus shown in FIG. 1, the effect of varying feed liquid temperature was compared. All other independent variables were held constant at the same conditions including the feed gas and liquid flow and compositions and the pH. In one test, the $1^{st}$ liquid stream or ABS/DAS feed solution temperature was set at 83° C. In the second test, the feed solution temperature was set at 51° C. At the higher temperature, 16 mol % of the $H_2S$ was absorbed while at lower temperature, 40 mol % of the feed $H_2S$ was absorbed. When the temperature was lowered, $NH_3$ absorption increased from 87 mol % to approximately 100 mol %, showing that mass transfer of both $H_2S$ and $NH_3$ increases with reduced temperature.

Without being bound by theory, it is believed the increase is attributed to a combination of effects within the contact zone. Reduced temperature leads to an increase in the fraction of all components, $H_2S$, $NH_3$, and $H_2O$, that are all condensing and absorbing into the solution together where in addition, conditions lead to longer residence time in the spray reaction zone for the gas phase in contact with the liquid (due to gas law volume reduction). During this time, the gas-phase mass transfer resistance is very low since the thickness of the gas-film thickness would be non-existent and total mass transfer would only be liquid-phase limited. Heat release upon absorption of all gas-phase components eventually arrests the effect in the within reaction zone due to evaporation of water and establishment of a gas-phase film resistance.

Effect of Feed Gas $NH_3$:$H_2S$ Ratio. The matrix included, independently, variable flow rates for each the $H_2S$ and $NH_3$ flows to the Venturi. This allowed for testing of the effect of the ratio of $NH_3$:$H_2S$ in the feed gas. It was included since, in commercial practice, this ratio shows some variability according the composition of refinery feedstocks that lead to the production Sour Water Stripper gas that would feed the process of this invention.

In the numerical analysis of the $NH_3$ and $H_2S$ mass transfer response, these variables were combined into a single independent variable, $NH_3$:$H_2S$. It was found that $H_2S$ absorption/rejection was insensitive to this ratio while $NH_3$ absorption showed a modest, but measurable response. Lower values of $NH_3$:$H_2S$ showed higher $NH_3$ mass transfer rates over higher values. The inventor attributes this to the liquid phase mass transfer resistance; i.e., limited capacity in the liquid film to accept and hydrolyze ammonia.

Interaction and Non-linearity of Response Variables. Non-linearity: The matrix center-point experiments show that the absorption mass transfer response to the independent variables are non-linear and lead to the selection of a "power law" regression equation. Interaction between independent variables, such as the case for liquid and gas flow rates, and ABS concentration with L/G.

Effect of Feed Gas Temperature on Reaction Zone Residence Time. As feed gas temperature increases, the residence time in a reaction zone necessarily decreases. The fact of decreased residence time will necessarily reduce conversion of both $H_2S$ and $NH_3$ hydrolysis reactions at the interface due to gas film resistance limitations. The effect has not been quantified by itself from the laboratory work, but its effect is acknowledged.

Regression Equations for Absorption of $H_2S$ and $NH_3$. Two equations were developed. Presented below is the equation for $H_2S$ mass transfer, expressed as the fraction of feed $H_2S$ rejected (not absorbed) in the venturi contactor as a function of liquid and gas flows and concentration of sulfite buffer in the feed liquor:

$$H_2S \text{ \% Rejected} = \ln\left(2.306(C_B)^{-0.188}\left[1,000\times\left(\frac{L}{G}\right)\right]^{-0.133}\right)$$

Where: $C_B$ is the concentration in weight percent of the solution of $(NH_4)HSO_3$ and $(NH_4)_2SO_3$ expressed as $(NH_4)HSO_3$ (i.e., as ABS) in the venturi feed solution, L is the liquid flow rate to the venturi in kilograms-per-hour, and G is the feed gas flow rate to the venturi in standard-cubic-meters-per-hour.

Presented below is the equation for $NH_3$ mass transfer, expressed as the fraction of feed $NH_3$ absorbed in the venturi contactor as a function of liquid and gas flows, concentration of sulfite buffer, feed solution pH, and the feed gas ammonia-to-hydrogen sulfide ratio:

$NH_3\%$ Absorbed =
$$10.8\left[1,000\times\left(\frac{L}{G}\right)\right]^{0.705}(C_B)^{0.407}(pH)^{-2.45}(NH_3:H_2S)^{-0.15}$$

Where: $C_B$, L, and G are previously defined, pH is the measured "neat" pH of the feed solution containing high concentrations of sulfite buffer and ATS (at solution densities in the range of 1.31 to 1.35 kg/L), and $NH_3:H_2S$ is the molar ratio of each component in the gas feeding the venturi spray contactor.

The specific regressed coefficients are specific to the apparatus and should not be expected to precisely predict performance in other systems. The value of each constant would be expected to shift upward or downward depending upon numerous system-specific differences in configuration and measurement.

Example: Commercial Scale Demonstration Current Invention: Conversion of Existing Equipment from Non-Functional For ATS Production from Mixed $NH_3$–$H_2S$ Feed Gas A new commercial-scale facility was constructed for ATS production from a mixed feed of $NH_3$ and $H_2S$. The process employed a counter-current packed tower configuration for contacting the mixed feed gas with an ABS and DAS-containing buffer solution with the objective of recovering substantially all of the $NH_3$ while allowing the bulk of $H_2S$ to pass through unabsorbed. All attempts to start-up and operate this facility using its originally installed technology had failed. Operators of the Unit found they were unable to maintain production of the primary reaction precursor buffer components, ABS and DAS. It became apparent to the operators of this facility that originally installed technology could not work. Furthermore, the final 15 attempts to start-up and operate included addition of an external source of $H_2S$ in order to attempt to support ABS/DAS production within the Unit. Most of these start-up attempts also included an external source of $NH_3$ for the same purpose. In all cases, the initial starting buffer concentration fell toward zero after 1-4 hours of operation and the process was shut down.

Following the failed attempts to operate the commercial unit in its original configuration, key elements of the current invention were employed at this facility to enable stable operation via sustainable production of ABS and DAS using the mixed $NH_3+H_2S$ feed gas alone. A configuration substantially represented in FIG. 2 was used to implement aspects of the disclosed invention at a commercial scale. The $NH_3+H_2S$ feed gas Stream 100 was introduced to the co-current spray contactor, V-400, and mixed with an ABS/DAS containing absorbing solution, replacing the intended function of the original counter-current packed tower. The mixed feed of $NH_3$ and $H_2S$ provided all of the sulfur required to support ABS/DAS production with no requirement for external sources of $H_2S$.

Figure 9:
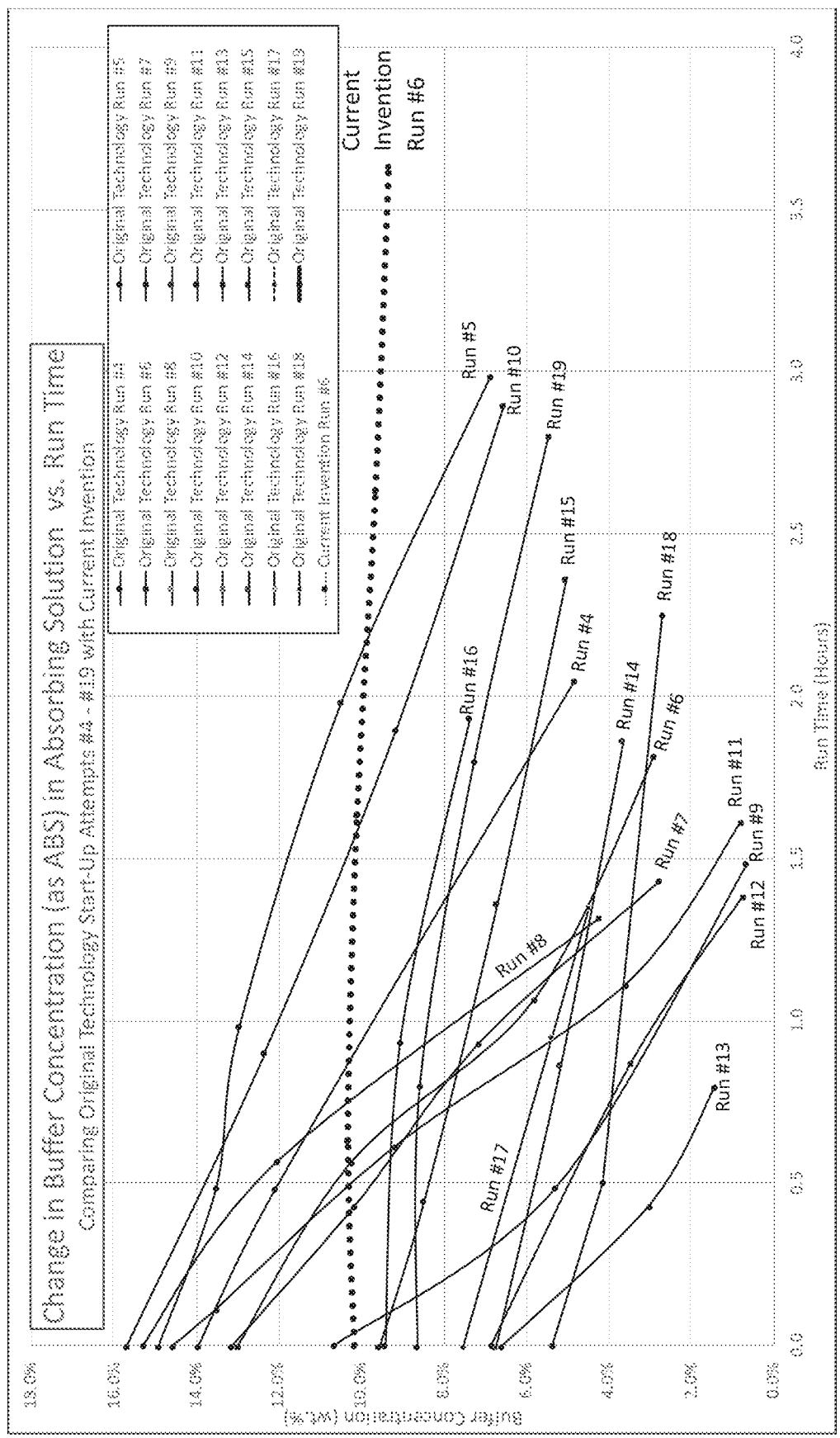
FIG. 9 is a chart comparing changes in the buffer concentration of process absorbing solutions during commercial plant start-up for this invention vs. previous technology

FIG. 9 compares changes in buffer concentration during the plant start-up interval for the last sixteen of nineteen start-up attempts using the Original Technology approach versus that of the disclosed invention. In the run, labeled "Current Invention Run #6", FIG. 9 shows that stable ABS/DAS buffer concentration was maintained while the buffer concentration fell in all cases where the Original Technology was employed.

Example: Commercial Scale Production

Operators of the commercial-scale ATS Production Unit chose to use an embodiment of the current invention that is substantially depicted in FIG. 3. Though this configuration is not as efficient and economical regarding recovery of the mixed feed gas components as the configuration depicted in either FIG. 2 or FIG. 4, the FIG. 3 configuration employed allows operation using existing equipment to gain a substantive benefit regarding chemical reagent costs without requiring further capital expenditures associated with the preferred FIG. 4 configuration. With this FIG. 3 configuration, fresh ABS-rich absorbing buffer solution (Stream 306) is continuously fed to a circulating loop (Stream 314) where it is co-currently spray contacted (using V-400) with the mixed $NH_3+H_2S$ feed. A small flow (Stream 316) is withdrawn as ATS Product and excess V-400 effluent becomes Stream 315 for recycle to V-404 to provide for further buffer production. Substantially all of the $NH_3$ and approximately 40% of the $H_2S$ are absorbed from the mixed feed in the V-400 contact stage. Overall, approximately 70% of the total Product sulfur and 55% of the total ATS Product nitrogen is supplied by the mixed $NH_{3+}H_2S$ feed gas. Approximately 30% of the total ATS Product sulfur is supplied from an external source of $H_2S$ via Stream 319 and approximately 45% of total ATS Product nitrogen is supplied from an external source of $NH_3$ via stream 313.

General Guidelines:

The first V-200 and second V-204 contact stages both require a mixture of ABS and DAS, however not in the same ratios. The first contact stage V-200 requires a mixture with a higher concentration of ABS and the second contact stage V-204 requires a higher concentration of DAS. The chemical reactions in the first contact stage V-200 creates a higher concentration of DAS which can then be circulated via stream 107 for use to the second contact stage V-204. The chemical reactions in the second contact stage V-204 creates higher concentrations of ABS which can then be circulated via stream 106 for use in the first contact stage V-200. The ABS and DAS solutions are circulated between the two reaction zones carrying the necessary ratios of ABS and DAS to each zone, regenerating each other in turn.

The optimal absorption of ammonia and rejection of hydrogen sulfide in the first contact stage V-200 is favored by a combination of one or more of the following factors:
1. Relatively higher temperatures. For example, gas liquid contact at 200 deg. F. is better for $H_2S$ rejection than contact at 150 deg. F.
2. Low pH. For example, absorption of ammonia and the rejection of hydrogen sulfide is better at a feed solution neat pH of 5.6 than at a pH of 5.9 or higher. However, $SO_2$ emission are difficult to control when the solution leaving the $2^{nd}$ gas-liquid contact stage V-204 has a pH of less than about 5.5, therefore operation in V-200 is preferred to be between 5.5-5.8.
3. Relatively higher liquid rates favor ammonia absorption. Higher liquid rates translate to higher buffer capacity in the absorbing solution. There should be sufficient flow to V-200 in order to absorb substantially all of the ammonia in stream 101.
4. Relatively higher ABS concentrations favor ammonia absorption, and to a lesser degree hydrogen sulfide absorption. Feed solution to V-200 must have an ABS concentration as well as flow rate sufficiently greater than the quantities of ammonia in the feed gas, preventing an unnecessary passing-through of ammonia to the burner.

Operation at relatively higher temperatures results in higher concentrations of water vapor in the gas traffic through the absorption/reaction zone V-200. Higher concentrations of water vapor increase the resistance to mass transfer for both ammonia and hydrogen sulfide. However, the diffusion coefficient for ammonia is about an order of magnitude greater than for hydrogen sulfide, allowing for the ammonia to preferentially absorb into solution. Additionally, higher concentrations of water vapor in the contact stage V-200 also increases the velocity of the gas through the absorption zone, reducing the residence time for both of the gases. The lower residence time, coupled with a smaller diffusion coefficient for $H_2S$, allows for the hydrogen sulfide to preferentially pass through while allowing $NH_3$ to be preferentially absorbed into solution. The use of the single-stage co-current Contact stage takes advantage of these properties in a way that is not possible with other contact methods such a counter current column operation. It is within the scope of the disclosed invention to provide a second, smaller co-current stage added in series to affect a more complete absorption of $NH_3$ while still rejecting $H_2S$. The flow of absorbing liquid would be necessarily much smaller. This would help prevent NOx emissions.

Acidic conditions in the Contact stage feed solution stream 106 enhances the preferential absorption of ammonia by providing favorable conditions for hydrolyzing ammonia, a basic gas, to ammonium ion:

$$NH_3 + H^+ \rightarrow NH_4^+$$

while the hydrogen sulfide, a weak acid, is preferentially rejected due to the relative paucity of hydroxyl ions:

$$H_2S + OH^- \rightarrow HS^- + H_2O$$

The function of V-206 is as an environmental safeguard for the capture of $SO_2$. It also functions as a point for make-up water addition, serving for density control while, importantly, monitoring its solution pH as an indicator of changes in both $SO_2$ and/or $NH_3$ present in the gas traveling through. Water addition via stream 110 controls the density of the circulating solutions. Stream 111 is a water circulation pump around loop where pH is monitored in a dilute solution. The stream 111 loop that includes $NH_3$ addition also ensures that any $SO_2$ that may break through during a unit upset is captured, preventing emissions. Stream 109 pump around loop is also intended to capture $SO_2$ and $NH_3$ that may survive the contact stage V-204, by circulating a very dilute ABS/DAS solution. Stream 105 is the means by which the water from stream 110 is introduced to the circulating solutions to control density.

The Stream 111 circulation loop will also have a supply of $NH_3$ (aqua or anhydrous) stream 112, to safeguard against $SO_2$ emissions. This stream is meant to ensure sufficient capacity for neutralizing any $SO_2$ break-through that may occur during normal operations as well as be capable of handling any upset conditions.

While specific embodiments and examples of the present invention have been illustrated and described, numerous modifications come to mind without significantly departing from the spirit of the invention, and the scope of protection is only limited by the scope of the accompanying claims.

The invention claimed is:
1. A method for making an aqueous solution of ammonium thiosulfate (ATS) comprising:
   co-currently contacting a first gas feed stream containing hydrogen sulfide ($H_2S$) and ammonia ($NH_3$) with a first liquid stream containing an aqueous solution of ammonium bisulfite (ABS) and di-ammonium sulfite (DAS) within a first gas-liquid contact stage under controlled physical conditions to cause the following liquid chemical reactions to occur and to produce a second gas stream and a second liquid stream:

$$NH_3 + ABS \leftrightharpoons DAS \quad (1)$$

$$H_2S + DAS \rightarrow AHS + ABS \quad (2)$$

$$2\ AHS + 4\ ABS \rightarrow 3\ ATS + 3\ H_2O \quad (3)$$

controlling the physical conditions within the first gas-liquid contact stage to control relative absorption mass-transfer rates for $NH_3$ and $H_2S$ to favor absorption of $NH_3$ into the liquid phase and cause reaction (1) and to limit absorption of $H_2S$ into the liquid phase and thereby limit the formation of ammonium hydrosulfide (AHS) in reaction (2) and limit the formation of ATS in reaction (3), wherein the second gas stream contains unreacted $H_2S$ and the second liquid stream contains a mixture of DAS, ATS, and ABS, wherein the physical conditions are selected from a temperature of the first gas stream, a temperature of the first liquid stream, a ratio of feed rates of the first gas feed stream and first liquid feed stream, a concentration of dissolved ABS and DAS in the first liquid stream, pH of the first liquid stream, a first liquid stream buffer capacity, and combinations thereof; and
   removing a first fraction of the second liquid stream to recover the aqueous solution of ATS.
2. The method of claim 1 further comprising:
   oxidizing $H_2S$ in the second gas stream to form $SO_2$ and produce a third gas stream;
   contacting the third gas stream containing $SO_2$ with a second fraction of the second liquid stream within a second gas-liquid contact stage to cause the chemical reaction:

$$SO_2 + DAS \rightarrow 2\ ABS \quad (4)$$

to occur, and to produce a fourth gas stream and a third liquid stream containing ABS and DAS; and recycling a portion of the third liquid stream to the first gas-liquid contact stage as the first liquid stream.

3. The method of claim 2 wherein the quantity of hydrogen sulfide absorbed in the $1^{st}$ gas-liquid contact stage has been sufficiently limited so that no more $H_2S$ is hydrolyzed to AHS and then converted to ATS than the maximum amount allowed by the ATS reaction stoichiometry in the $1^{st}$ gas-liquid contacting stage as defined by the $1^{st}$ Gas $H_2S$ Absorption/Rejection Ratio, according to, $$\frac{\text{mols } H_2S \text{ into } 2^{nd} \text{ Gas}}{\text{mols } H_2S \text{ absorbed into } 1^{st} \text{ Liquid}} = 1^{st} \text{ Gas } H_2S \frac{\text{Rejection}}{\text{Absorption}} \text{Ratio}$$

where, the $1^{st}$ Gas $H_2S$ Rejection/Absorption Ratio is calculated as:

$$1^{st} \text{ Gas } H_2S \frac{\text{Rejection}}{\text{Absorption}} \text{Ratio} = \left[\frac{4/3\left(\frac{C_{ATS,mass}}{MW_{ATS}}\right) + \left(\frac{C_{B,mass}}{MW_{ABS}}\right) + \left(\frac{C_{AS,mass}}{MW_{AS}}\right)}{2/3\left(\frac{C_{ATS,mass}}{MW_{ATS}}\right)}\right]$$

where in the $1^{st}$ Gas $H_2S$ Rejection/Absorption Ratio equation: $C_{ATS,mass}$, $C_{B,mass}$, and $C_{AS,mass}$ is in units of mass of solute-per-mass of aqueous solution, MW is molecular weight of each in consistent units, such that the quantity of hydrogen sulfide present in the $2^{nd}$ gas stream, when oxidized to sulfur dioxide, can be converted to aqueous ammonium bisulfite and returned to the $1^{st}$ gas-liquid contact stage.

4. The method of claim 2 where the $H_2S$-rich $2^{nd}$ gas stream is oxidized to provide a $3^{rd}$ gaseous stream that is rich in $SO_2$, that is fed together with the DAS-rich $2^{nd}$ liquid to a $2^{nd}$ gas-liquid contacting zone where the molar quantity of $SO_2$ is hydrolyzed with an equal-molar portion of DAS, and converting each species to aqueous ABS, and the effluent liquid of from the $2^{nd}$ gas-liquid contact stage comprises the $1^{st}$ liquid feed for recycle back to the $1^{st}$ gas-liquid contact stage, and the vapor effluent comprises a $4^{th}$ gas stream.

5. The method of claim 2 where a separate source of hydrogen sulfide is added to the $2^{nd}$ gas stream to satisfy the ABS production requirement for the ATS reaction in the $1^{st}$ gas-liquid contacting stage in the case where the $H_2S$ rejection requirement, as defined by the $1^{st}$ Gas $H_2S$ Rejection/Absorption Ratio equation, has not been met.

6. The method of claim 5 where a separate source of aqueous ABS is added to the $1^{st}$ or $2^{nd}$ liquid stream, is substituted for the addition hydrogen sulfide gas.

7. The method of claim 2 where, in the case that the $1^{st}$ feed gas contains a molar excess of $H_2S$ relative to its molar rate of $NH_3$, whereby the quantity of DAS produced in the $2^{nd}$ liquid is insufficient for conversion of all $SO_2$ in the $3^{rd}$ gas stream to ABS, a separate source of $NH_3$ is added to either the $1^{st}$ or $2^{nd}$ liquid stream, converting a portion of the stream's ABS to DAS.

8. The method of claim 7 where the excess $H_2S$ is split as a purge stream from the $2^{nd}$ gas prior to oxidation and removed from the process and no separate source of $NH_3$ is added.

9. The method of claim 1 where the gas-liquid contact stage is a Venturi-type fume scrubber or a static mixer.

10. The method of claim 1 where two or more single stage co-current contactors are operated sequentially as the $1^{st}$ gas-liquid contact stage.

11. The method of claim 4 where the $4^{th}$ gas stream, containing $SO_2$ and some $NH_3$, are recovered and returned to the $1^{st}$ or $2^{nd}$ liquid streams, in a chemically reactive absorption stage using a separate source of ammonia and water as a scrubbing agent, returning an ABS/DAS buffer solution to the process and to prevent $SO_2$ and $NH_3$ release in the $5^{th}$ gas stream to the environment.

12. The method of claim 11 where the absorption stage comprises four counter currently organized sequential gas-liquid stages comprising:

a. Zone 1 (bottom) where a portion of $2^{th}$ liquid stream is directed to the contact zone and the $4^{th}$ gas stream flows counter currently through and exits toward Zone 2;

b. Zone 2 (lower-mid) where a packed or trayed section and including a trap-tray and circulation pump, anhydrous or aqua ammonia is added to the circulating solution on pH feedback control, a dilute ABS-DAS solution overflows the trap tray and supplements the liquid feed to Zone 1, and the $4^{th}$ gas stream leaves the stage toward Zone 3 and has comparatively more $NH_3$ than $SO_2$, and this section captures most of the $SO_2$ in the $4^{th}$ gas stream;

c. Zone 3 (upper-mid) whereby utilizing a packed or trayed section and including a trap-tray and circulation pump, a dilute solution captures $NH_3$ and small quantities of $SO_2$ in the vapor leaving Zone 2, whereby this section removes most $NH_3$ and $SO_2$ that would be considered important before environmental release, and the further scrubbed $4^{th}$ gas stream then flows into Zone 4 and the dilute solution becomes the liquid feed to Zone 2; and d. Zone 4 (upper) where process make-up water is added to a top tray and whereby small, ppm-level quantities of $NH_3$ and $SO_2$ are absorbed as the $4^{th}$ gas stream flows counter currently to the liquid, and the $NH_3$ and $SO_2$ are removed hydrolyzed into the make-up water.

13. The method of claim 3 where the $1^{st}$ feed liquid buffer concentration is controlled to between 3 wt. % and 25 wt. % to provide the degree of $H_2S$ rejection dictated by the requirement defined in the $1^{st}$ Gas $H_2S$ Rejection/Absorption Ratio equation.

14. The method of claim 3 where the ratio of $1^{st}$ feed liquid rate to the $1^{st}$ feed gas rate is between 15:1 and 75:1 on a weight-to-weight basis in order to provide the degree of $H_2S$ rejection dictated by the requirement defined in the $1^{st}$ Gas $H_2S$ Rejection/Absorption Ratio equation while simultaneously achieving substantially complete absorption of the $1^{st}$ feed gas ammonia.

15. The method of claim 3 wherein the temperature is increased to increase the fraction of feed gas $H_2S$ to the $1^{st}$ gas-liquid contact stage rejected to the $2^{nd}$ gas stream or decreased to decrease the fraction rejected to provide the degree of $H_2S$ rejection dictated by the requirement defined in the $1^{st}$ Gas $H_2S$ Rejection/Absorption Ratio equation.

16. The method of claim 1 wherein the measured pH of the concentrated aqueous $1^{st}$ liquid feed has been controlled to be in the range between 5.3 and 5.8, or when measured in a 5,000:1 or greater dilution, a pH between 6.3 and 6.9, such that substantially all of the $1^{st}$ feed gas ammonia is absorbed in the $1^{st}$ gas-liquid contact stage and is recovered into the $2^{nd}$ liquid stream effluent from the stage.

17. The method of claim 1 wherein the value of the $1^{st}$ feed gas ratio of ammonia-to-hydrogen sulfide is used to modify other process independent parameters of feed flow, temperature, pH, and buffer concentration, to optimize ammonia absorption in the $1^{st}$ gas-liquid contact stage.

18. The method of claim 1 wherein the temperature of the reaction zone is sufficiently high to increase the velocity of gas traffic through the contact stage, such that the residence time of the feed streams in the reaction zone is decreased.

19. The method of claim 1 wherein, during a time interval where the first feed gas flow rate and composition to the first gas-liquid stage are constant and the first liquid feed to the first gas-liquid contactor is also constant, changes in the measured difference between the pH of the liquid feed to the first gas-liquid contactor and the pH of the liquid feed to the second gas-liquid contactor may be interpreted as a change in the buffer concentration, of either liquid stream, in the interval between measurements of the pH difference between the two streams.

\* \* \* \* \*